United States Patent
Park et al.

(10) Patent No.: US 11,711,805 B2
(45) Date of Patent: Jul. 25, 2023

(54) WIRELESS COMMUNICATION SYSTEM FOR COORDINATED MULTI-POINT COMMUNICATION AND OPERATION METHOD THEREOF

(71) Applicant: SAMSUNG ELECTRONICS CO., LTD., Suwon-si (KR)

(72) Inventors: Jungmin Park, Seoul (KR); Junghyun Bae, San Diego, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 17/174,504

(22) Filed: Feb. 12, 2021

(65) Prior Publication Data

US 2021/0298050 A1 Sep. 23, 2021

Related U.S. Application Data

(60) Provisional application No. 62/992,584, filed on Mar. 20, 2020.

(30) Foreign Application Priority Data

Jun. 11, 2020 (KR) .......................... 10-2020-0071030

(51) Int. Cl.
*H04W 72/1273* (2023.01)
*H04L 5/00* (2006.01)
*H04W 72/20* (2023.01)
*H04W 72/21* (2023.01)

(52) U.S. Cl.
CPC ....... *H04W 72/1273* (2013.01); *H04L 5/0048* (2013.01); *H04L 5/0064* (2013.01); *H04W 72/20* (2023.01); *H04W 72/21* (2023.01)

(58) Field of Classification Search
CPC .............. H04L 5/0048; H04L 5/0064; H04W 72/1273; H04W 72/0413; H04W 72/1278
USPC ........................................................ 370/329
See application file for complete search history.

(56) References Cited

U.S. PATENT DOCUMENTS

| 9,686,772 B2 | 6/2017 | Chen et al. | |
| 2014/0071841 A1* | 3/2014 | Hu | H04L 5/0073 370/252 |
| 2015/0009933 A1* | 1/2015 | Zirwas | H04B 7/024 370/329 |

(Continued)

FOREIGN PATENT DOCUMENTS

| KR | 10-1806649 B1 | 12/2017 |
| KR | 10-1939298 B1 | 1/2019 |

(Continued)

*Primary Examiner* — Chi Tang P Cheng
(74) *Attorney, Agent, or Firm* — Sughrue Mion, PLLC

(57) ABSTRACT

A wireless communication system is provided. The wireless communication system includes a first cell configured to communicate with a second cell and a terminal. The first cell includes a processor configured to control the first cell to: select one of a plurality of scheduling modes related to rate matching of physical downlink shared channels (PDSCHs) based on control information exchanged with the second cell; and transmit a first PDSCH to the terminal according to the selected scheduling mode while the second cell transmits a second PDSCH to the terminal according to the selected mode. The terminal is configured to perform processing on the first PDSCH and the second PDSCH based on the selected scheduling mode.

17 Claims, 22 Drawing Sheets

(56) References Cited

U.S. PATENT DOCUMENTS

| | | | |
|---|---|---|---|
| 2016/0198443 A1* | 7/2016 | Chen ................... | H04W 72/085 370/329 |
| 2018/0242296 A1 | 8/2018 | Li et al. | |
| 2019/0280803 A1* | 9/2019 | Muruganathan ........ | H04L 5/005 |
| 2020/0221428 A1 | 7/2020 | Moon et al. | |
| 2020/0280996 A1 | 9/2020 | Yang et al. | |

FOREIGN PATENT DOCUMENTS

| KR | 10-2019-0017675 A | 2/2019 |
|---|---|---|
| KR | 10-2049422 B1 | 11/2019 |
| KR | 10-2020-0004383 A | 1/2020 |

\* cited by examiner

WIRELESS COMMUNICATION SYSTEM FOR COORDINATED MULTI-POINT COMMUNICATION AND OPERATION METHOD THEREOF

CROSS-REFERENCE TO RELATED APPLICATIONS

This application claims the benefit of U.S. Provisional Application No. 62/992,584, filed on Mar. 20, 2020 in the U.S. Patent and Trademark Office and Korean Patent Application No. 10-2020-0071030, filed on Jun. 11, 2020 in the Korean Intellectual Property Office, the disclosures of which are incorporated herein by reference in their entireties.

BACKGROUND

1. Field

Methods, apparatuses and systems consistent with example embodiments relate to a wireless communication system, and more particularly, to a wireless communication system for performing Coordinated Multi-Point communication transmission and reception (CoMP).

2. Related Art

In order to improve the performance and user quality of a wireless communication system, research and standardization on CoMP technology between cells are being conducted. The CoMP between cells generically refers to technologies based on mutual coordination of geographically separated transmission points or reception points.

Additionally, wireless communication technologies, next-generation communication technologies such as 5th Generation (5G) are continuously developed according to the needs of users and operators, and research is being conducted on the efficient operation of the CoMP technology.

SUMMARY

Example embodiments provide a wireless communication system for securing more improved Coordinated Multi-Point communication (CoMP) performance by reducing the complexity when a terminal processes a physical downlink shared channel (PDSCH) received from a plurality of cells and by differentiating a scheduling mode for the PDSCH received from the plurality of cells according to the performance of the terminal, and a method of operating the wireless communication system.

The technical problems to be achieved are not limited to the technical problems mentioned above, and other technical problems that are not mentioned can be clearly understood by one of ordinary skill in the art from the following description.

According to an aspect of an example embodiment, a wireless communication system includes: a first cell configured to communicate with a second cell and a terminal. The first cell includes a processor configured to control the first cell to: select one of a plurality of scheduling modes related to rate matching of physical downlink shared channels (PDSCHs) based on control information exchanged with the second cell; and transmit a first PDSCH to the terminal according to the selected scheduling mode while the second cell transmits a second PDSCH to the terminal according to the selected mode. The terminal is configured to perform processing on the first PDSCH and the second PDSCH based on the selected scheduling mode.

According to an aspect of an example embodiment, a terminal includes a radio frequency integrated circuit (RFIC) configured to receive a first physical downlink shared channel (PDSCH) from a first cell and a second PDSCH from a second cell based on a selected scheduling mode from among a plurality of scheduling modes related to rate matching of PDSCHs; and a processor configured to perform processing on the first PDSCH and the second PDSCH based on the selected scheduling mode.

According to an aspect of an example embodiment, a method of operating a first cell of a wireless communication system which includes the first cell, a second cell, and a terminal, includes: selecting, by the first cell based on control information exchanged with the second cell, one of a plurality of scheduling modes related to rate matching of physical downlink shared channels (PDSCHs); and transmitting, by the first cell, a first PDSCH to the terminal according to the selected scheduling mode while to the terminal while the second cell transmits a second PDSCH to the terminal according to the selected mode. The terminal processes the first PDSCH and the second PDSCH based on the selected scheduling mode.

BRIEF DESCRIPTION OF THE DRAWINGS

The above and other objects and features will become more apparent from the following description of example embodiments with reference to the accompanying drawings in which.

DETAILED DESCRIPTION

Hereinafter, example embodiments will be described in detail with reference to the accompanying drawings.

Figure 1:
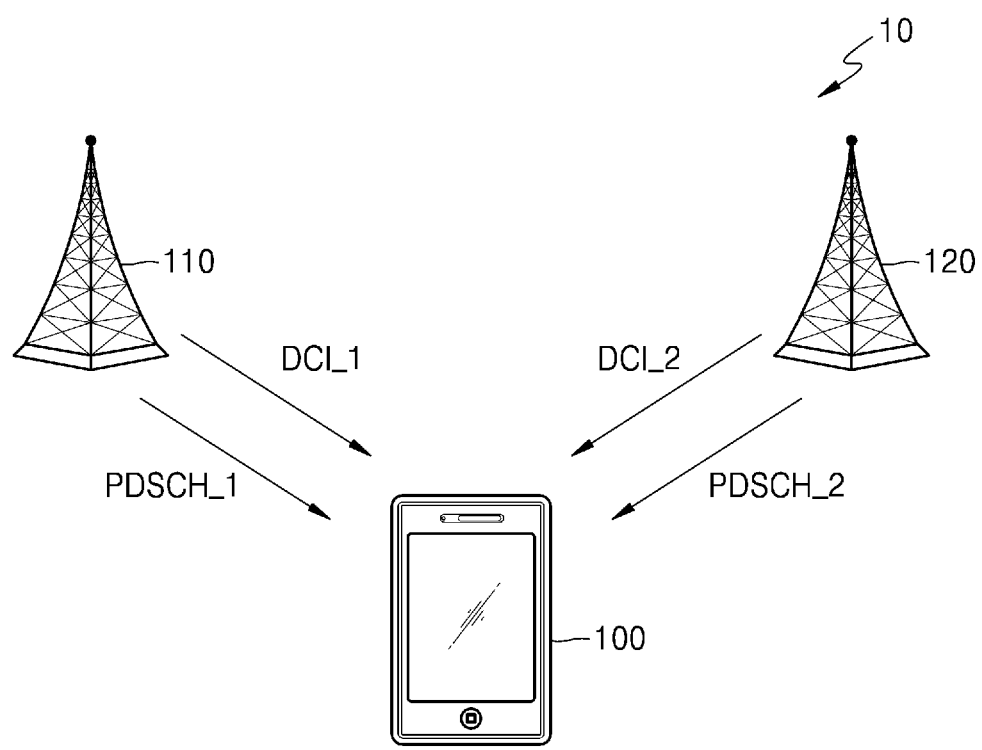
FIG. 1 is a block diagram of a wireless communication system according to an example embodiment.

FIG. 1 is a block diagram of a wireless communication system 10 according to an example embodiment. The wireless communication system 10 may be, though not limited thereto, a 5th generation (5G) system, a long term evolution (LTE) system, a code division multiple access (CDMA) system, a global system for mobile communications (GSM) system, a wireless local area network (WLAN) system, or any other wireless communication system. Hereinafter, the wireless communication system 10 will be described on the assumption that it is a 5G system, but it will be understood that example embodiments are not limited thereto.

A terminal 100 may refer to various devices capable of transmitting and receiving data and/or control information by communicating with first and second cells 110 and 120. The terminal 100 may be a wireless communication device, and may be fixed or mobile. For example, the terminal 100 may be referred to as user equipment (UE), a mobile station (MS), a mobile terminal (MT), a user terminal (UT), a subscriber station (SS), a wireless device, or a handheld device.

Each of the first and second cells 110 and 120 may generally refer to a fixed station communicating with the terminal 100 and/or other cells, and may exchange data and control information by communicating with the terminal 100 and/or other cells. For example, each of the first and second cells 110 and 120 may be referred to as a base station, Node B, evolved-Node B (eNB), a sector, a site, a base transceiver system (BTS), an access point (AP), a relay node, a remote radio head (RRH), a radio unit (RU), a small cell, or the like. In this specification, each of the first and second cells 110 and 120 may have a comprehensive meaning indicating some areas or functions covered by a base station controller (BSC) in CDMA, Node-B in WCDMA, and eNB or the sector (site) in LTE, and may cover all of various coverage areas, such as a megacell, macrocell, microcell, picocell, femtocell, relay node, RRH, RU, and a small cell communication range.

A wireless communication network between the terminal 100 and the first and second cells 110 and 120 may support communication between users by sharing available network resources. For example, in a wireless communication network, information may be transferred through various multiple access methods such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

Referring to FIG. 1, the wireless communication system 10 may include the first cell 110, the second cell 120, and the terminal 100. In FIG. 1, a limited number of cells and terminals are illustrated for convenience of description, but this is only an example, and example embodiments are not limited thereto. It is clear that example embodiments may be applied to a wireless communication system including a larger number of cells and terminals. In addition, it is premised that the first and second cells 110 and 120 and the terminal 100 perform Coordinated Multiple-Point communication (CoMP).

The terminal 100 may communicate with the first and second cells 110 and 120 through uplink and downlink with the first and second cells 110 and 120, respectively. For example, in the uplink and downlink, control information may be transmitted through a control channel such as a physical downlink control channel (PDCCH), a physical control format indicator channel (PCFICH), a physical hybrid ARQ indicator channel (PHICH), a physical uplink control channel (PUCCH), an enhanced physical downlink control channel (EPDCCH), and data may be transmitted through a data channel such as a physical downlink shared channel (PDSCH) and a physical uplink shared channel (PUSCH). In this specification, transmission/reception of a signal through the PDSCH or the PDCCH may be expressed in the form of "transmitting/receiving the PDSCH or the PDCCH".

In an example embodiment, the first and second cells 110 and 120 may select any one of a plurality of scheduling modes related to rate matching of PDSCHs and transmit first and second PDSCHs PDSCH_1 and PDSCH_2 according to the selected scheduling mode to the terminal 100, respectively.

In an example embodiment, the plurality of scheduling modes related to the rate matching of PDSCHs may include scheduling modes which differ in a manner of allocating signals for performing rate matching to resources when the terminal 100 receives PDSCHs. For example, signals performing rate matching may include at least one of a phase tracking reference signal (PTRS) and an aperiodic zero power channel status information-reference signal (ZP CSI-RS). This will be described in detail with respect to FIGS. 5 to 8C. However, descriptions with respect to the PTRS and the aperiodic ZP CSI-RS are examples, and example embodiments are not limited thereto. Example embodiments may be applied to various reference signals transmitted through PDSCHs.

In an example embodiment, the plurality of scheduling modes related to the rate matching of PDSCHs may include scheduling modes which differ in a manner of allocating signals for performing rate matching to resources when the terminal 100 receives PDSCHs. transmitting, by the first and second cells, a downlink control information (DCI) indicating the selected scheduling mode to the terminal, or setting the selected scheduling mode through upper signaling with the terminal. As another example, the resource block may be defined as being scheduled by the PDCCH. This will be described in detail with respect to FIGS. 9 to 10C.

In an example embodiment, each of the first and second cells 110 and 120 may receive performance information indicating a supported processing method of the terminal 100 from the terminal 100 and may select one of a plurality of scheduling modes based on the received performance information. For example, when resources corresponding to the first PDSCH PDSCH_1 and resources corresponding to the second PDSCH PDSCH_2 overlap each other, the processing method may be changed according to the type of signals allocated to the overlapping resources, and the first and second cells 110 and 120 may schedule the first and second PDSCHs PDSCH_1 and PDSCH_2 to conform to a processing method that the terminal 100 may support. On the other hand, when the terminal 100 supports all processing methods, the first and second cells 110 and 120 may select a scheduling mode capable of securing optimum communication performance to schedule the first and second PDSCHs PDSCH_1 and PDSCH_2.

In an example embodiment, the first and second cells 110 and 120 may transmit first and second downlink control information (DCI) DCI_1 and DCI_2 indicating scheduling information of the first and second PDSCHs PDSCH_1 and PDSCH_2 based on the selected scheduling mode to the terminal 100. The terminal 100 may perform a processing operation on the first and second PDSCHs PDSCH_1 and PDSCH_2 based on the first and second downlink control information DCI_1 and DCI_2. In some example embodiments, the first and second cells 110 and 120 may set the selected scheduling mode through upper signaling with the terminal 100. The downlink control information DCI_1 and DCI_2 may include downlink scheduling allocation information including PDSCH resource designation, a transmission format, hybrid ARQ (HARD) information, and spatial multiplexing related control information. The terminal 100 may receive the first and second downlink control information DCI_1 and DCI_2 from the first and second cells 110 and 120 through first and second PDSCHs PDSCH_1 and PDSCH_2. In some example embodiments, the first and second cells 110 and 120 may exchange scheduling information about the terminal 100 and operate in the same scheduling mode, respectively.

The wireless communication system 10 according to an example embodiment may schedule the first and second PDSCHs PDSCH_1 and PDSCH_2 considering the performance of the terminal 100 to perform CoMP suitable for the terminal 100. In addition, the wireless communication system 10 has an effect of improving complexity of CoMP by preselecting a plurality of scheduling modes related to rate matching of PDSCHs and scheduling the first and second PDSCHs PDSCH_1 and PDSCH_2 in a common scheduling mode by the first and second cells 110 and 120.

Figure 2A:
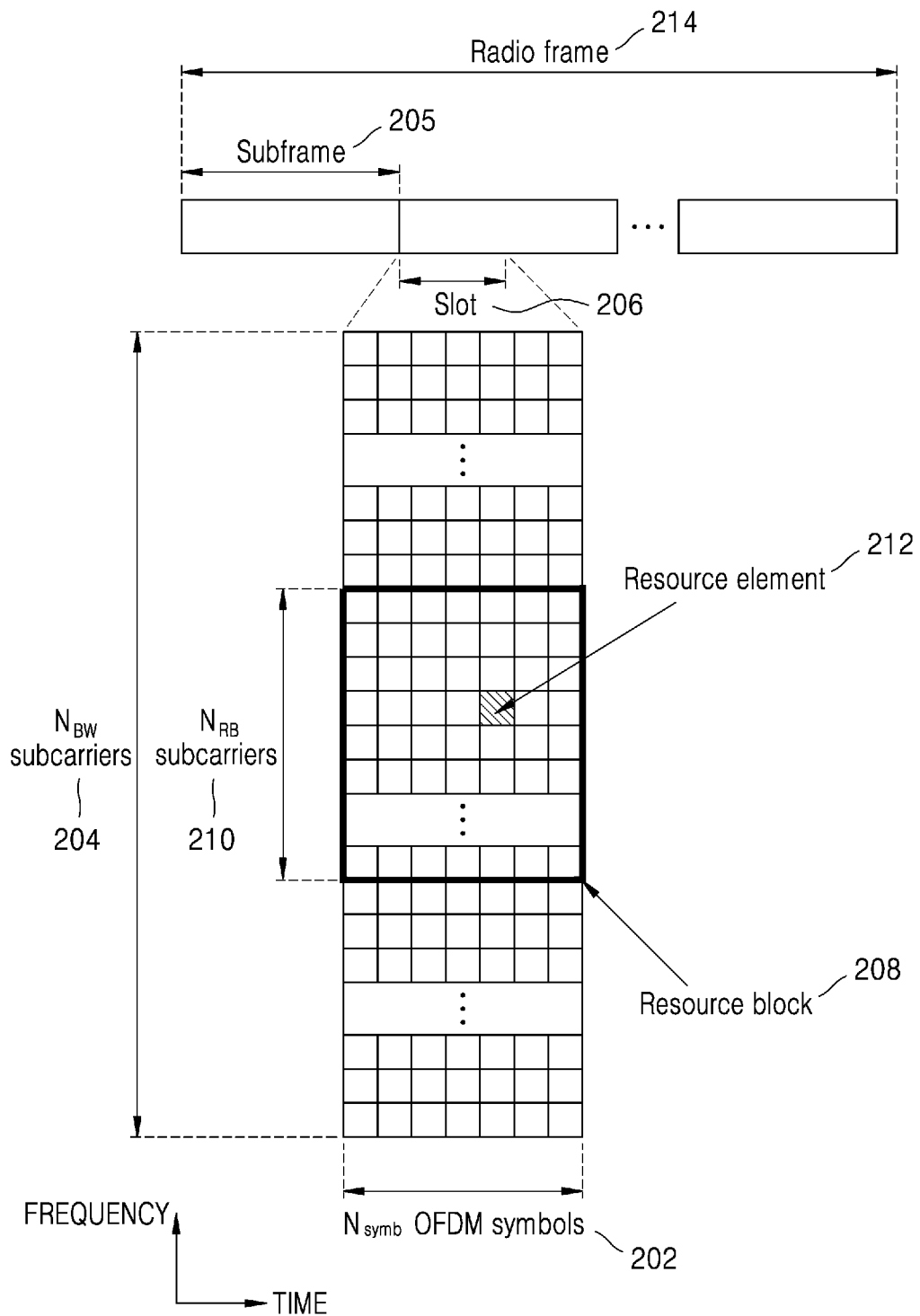
FIG. 2A is a view of a basic structure of a time-frequency domain in the wireless communication system of FIG. 1.
Figure 2B:
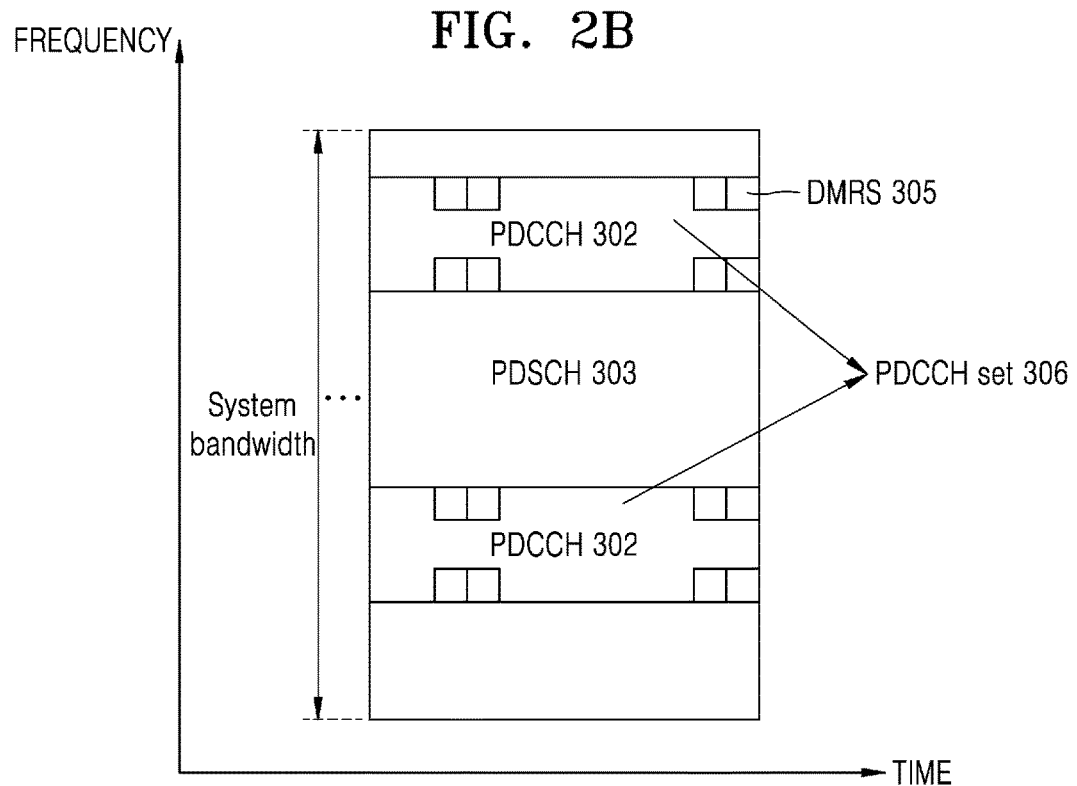
FIG. 2B is a view of physical downlink shared channels (PDSCHs) in the wireless communication system of FIG. 1.

FIG. 2A is a view of a basic structure of a time-frequency domain in the wireless communication system of FIG. 1, and FIG. 2B is a view of a PDSCH in the wireless communication system of FIG. 1.

Referring to FIG. 2A, the horizontal axis may denote a time domain and the vertical axis may denote a frequency domain. A minimum transmission unit in the time domain is an orthogonal frequency division multiplexing (OFDM) symbol, and $N_{symb}$ OFDM symbols 202 may be gathered to form one slot 206, and N slots (N is an integer greater than or equal to 1) may be gathered to form one subframe 205. For example, the number of slots constituting the subframe 205 may be determined by 'Numerology' of a communication system. For example, the length of the slot 206 may be 0.5 ms, and the length of the subframe may be 1.0 ms. Further, a radio frame 214 may be a time domain unit including 10 subframes 205.

A minimum transmission unit in the frequency domain is a subcarrier, and the entire transmission bandwidth may include a total of $N_{BW}$ subcarriers 204. In the time-frequency domain, a basic unit of a resource is a resource element (RE) 212, and may be represented by an OFDM symbol index and a subcarrier index. A resource block (RB) 208 may be defined as the $N_{symb}$ consecutive OFDM symbols 202 in the time domain and $N_{RB}$ consecutive subcarriers 210 in the frequency domain. Accordingly, one RB 208 may include ($N_{symb}*N_{RB}$) REs 212. A downlink channel including PDCCH, PDSCH, and the like may be transmitted from a cell in the wireless communication system to a terminal through resources in the time-frequency domain as shown in FIG. 2A.

Referring to FIG. 2B, a PDCCH 302 may be frequency multiplexed with a PDSCH 303 and transmitted. In the cell, resources of the PDCCH 302 and the PDSCH 303 may be appropriately allocated through scheduling, and thus, coexistence with data transmission for the terminal may be effectively supported. A plurality of PDCCHs 302 may constitute one PDCCH set 306. Location information of the PDCCH set 306 is set terminal-specifically, and this may be signaled through remote radio control (RRC). A plurality of PDCCH sets 306 may be configured in each terminal, and one PDCCH set 306 may be configured to be multiplexed simultaneously to different terminals. In the PDCCH 302, a demodulation reference signal (DMRS) 305 may be used as a reference signal for decoding.

Figure 3A:
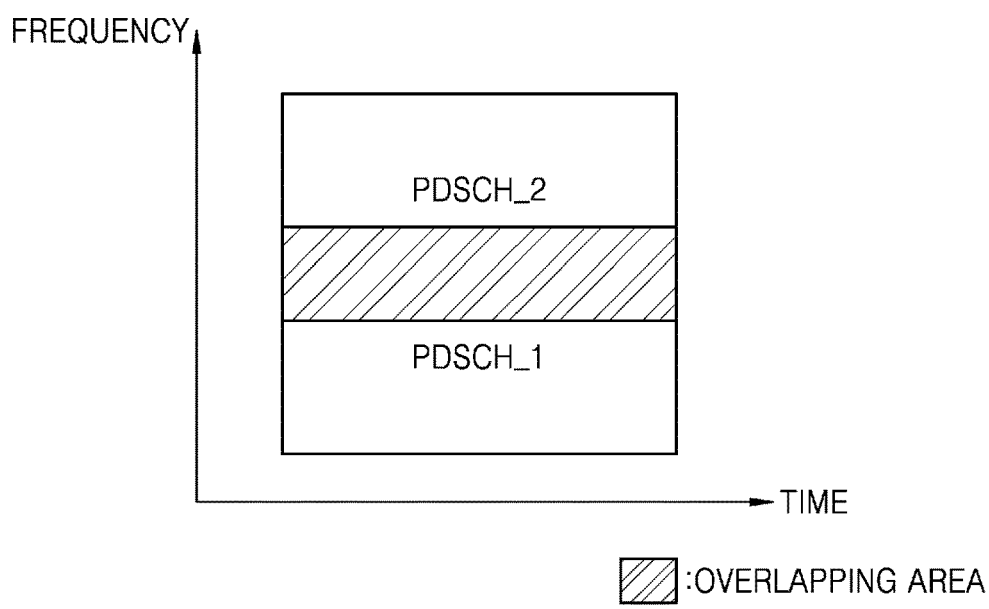
FIGS. 3A, 3B and 3C are views for describing an overlapping relationship between first and second PDSCHs of FIG. 1.
Figure 3B:
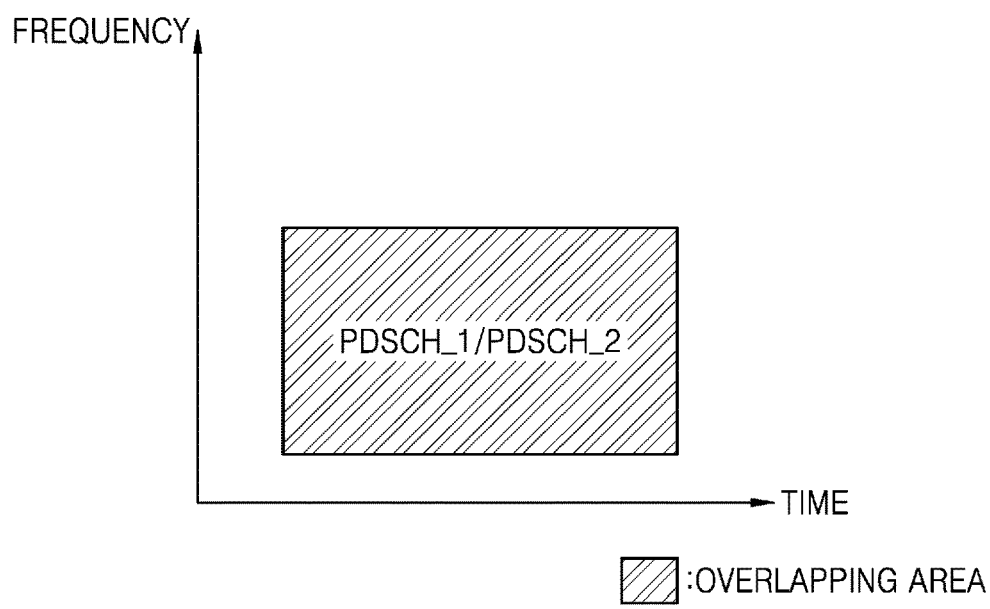
Figure 3C:
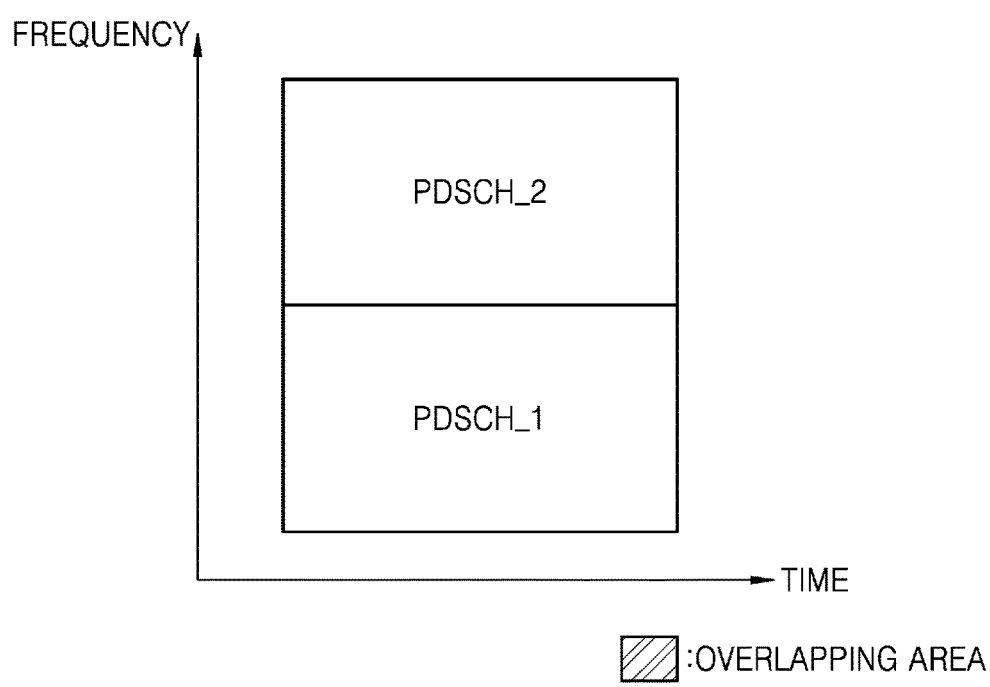

FIGS. 3A to 3C are views for describing an overlapping relationship between the first and second PDSCHs PDSCH_1 and PDSCH_2 of FIG. 1.

Referring to FIGS. 1 and 3A, the first PDSCH PDSCH_1 may partially overlap the second PDSCH PDSCH_2. In an example embodiment, the first and second cells 110 and 120 may perform scheduling such that the overlapping area includes at least one first resource corresponding to a PTRS or an aperiodic ZP CSI-RS included in the second PDSCH PDSCH_2 from among resources of the first PDSCH PDSCH_1, and the overlapping area includes at least one second resource corresponding to PTRS or aperiodic ZP CSI-RS included in the first PDSCH PDSCH_1 from among resources of the second PDSCH PDSCH_2. In another example embodiment, the first and second cells 110 and 120 may perform scheduling such that the overlapping area does not include resources corresponding to PTRS or aperiodic ZP CSI-RS included in the first PDSCH PDSCH_1 and resources corresponding to PTRS or aperiodic ZP CSI-RS included in the second PDSCH PDSCH_2.

In an example embodiment, the first and second cells 110 and 120 may perform scheduling such that the overlapping area includes resource blocks partially or entirely overlapped with resource blocks on which rate matching of the second PDSCH is performed from among resource blocks on which rate matching of the first PDSCH PDSCH_1 is performed. In another example embodiment, the first and second cells 110 and 120 may perform scheduling such that the overlapping area does not include resource blocks partially or entirely overlapped with resource blocks on which rate matching of the second PDSCH is performed from among resource blocks on which rate matching of the first PDSCH PDSCH_1 is performed.

Referring further to FIG. 3B, the first PDSCH PDSCH_1 may entirely overlap the second PDSCH PDSCH_2. In this regard, the first PDSCH PDSCH_1 may entirely overlap the second PDSCH PDSCH_2 based on a frequency axis and a time axis. In addition, the first PDSCH PDSCH_1 may overlap with the second PDSCH PDSCH_2 over the entire area based on a frequency axis, and may overlap only over a partial area based on a time axis. In summary, the first and second cells 110 and 120 may perform scheduling such that the first PDSCH PDSCH_1 and the second PDSCH PDSCH_2 overlap as a whole based on the frequency axis and the time axis, or overlap over the entire area based on the frequency axis.

Referring further to FIG. 3C, the first PDSCH PDSCH_1 may not overlap the second PDSCH PDSCH_2 based on the frequency axis. That is, the first and second cells 110 and 120 may perform scheduling such that the first PDSCH PDSCH_1 and the second PDSCH PDSCH_2 do not overlap each other based on the frequency axis.

The overlapping relationship between the first PDSCH PDSCH_1 and the second PDSCH PDSCH_2 disclosed in FIGS. 3A to 3B is an example, and example embodiments are not limited thereto. Various overlapping relationships may be implemented, and the first and second cells 110 and 120 may flexibly schedule the first and second PDSCHs PDSCH_1 and PDSCH_2 according to a communication environment.

Figure 4A:
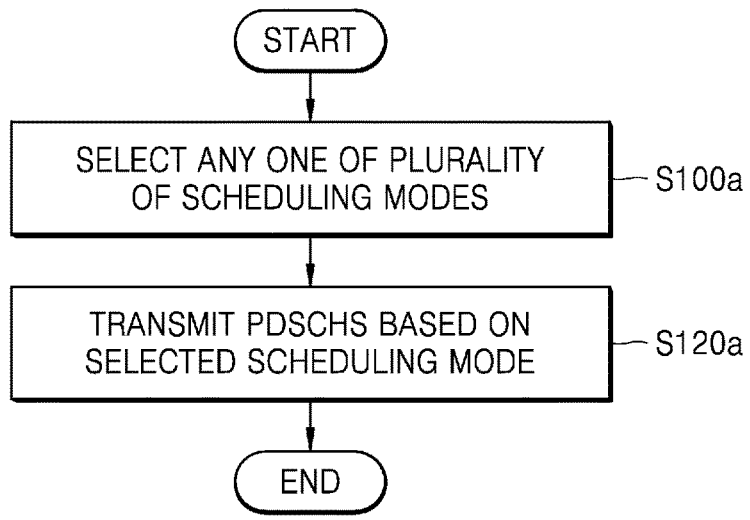
FIGS. 4A and 4B are flowcharts illustrating methods of operating a wireless communication system according to example embodiments.
Figure 4B:
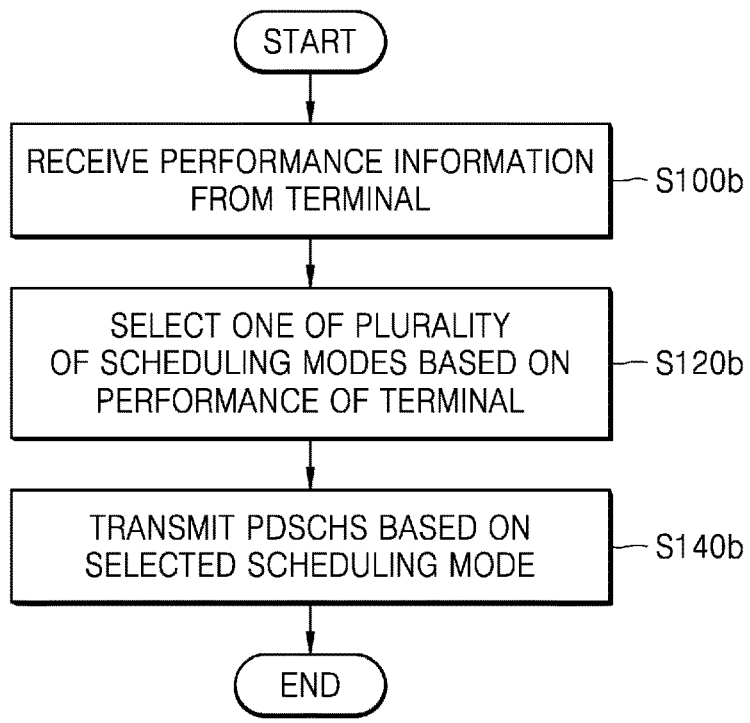

FIGS. 4A and 4B are flowcharts illustrating a method of operating a wireless communication system according to an example embodiment.

Referring to FIG. 4A, in operation S100a, each of a plurality of cells of the wireless communication system may select any one of a plurality of scheduling modes. In an example embodiment, the scheduling mode relates to a scheduling scheme for a PDSCH transmitted by each cell to a terminal. When the PDSCHs from the cells partially or completely overlap each other, the terminal may have different processing methods for data/reference signals (or data/non-data) or pieces of data/data allocated to overlapping resources. On the other hand, when the terminal sequentially processes the overlapping resources, if the processing method is frequently changed, processing complexity of the terminal increases, which may negatively affect a terminal for which low performance is guaranteed. In operation S120a, the cells may perform scheduling for PDSCHs based on a scheduling mode selected from among a plurality of scheduling modes in order to reduce the processing complexity of the terminal, and may transmit the scheduled PDSCHs to the terminal. The terminal may recognize in advance the scheduling mode selected by the plurality of cells, and may perform a processing operation on the PDSCHs in a manner conforming to the selected scheduling mode.

Referring to FIG. 4B, in operation S100b, each of the plurality of cells of the wireless communication system may receive performance information from the terminal. The performance information of the terminal may indicate a supported processing method. That is, the types of signals allocated to overlapping resources of PDSCHs received from the plurality of cells may vary according to a scheduling mode for a PDSCH, and the cells may check whether they may process signals allocated to the overlapping resources based on the performance information. In operation S120b, the plurality of cells may select one of a plurality of scheduling modes based on the performance of the terminal. In operation S140b, the plurality of cells may perform scheduling for PDSCHs based on the selected scheduling mode, and may transmit the scheduled PDSCHs to the terminal, respectively.

Figure 5:
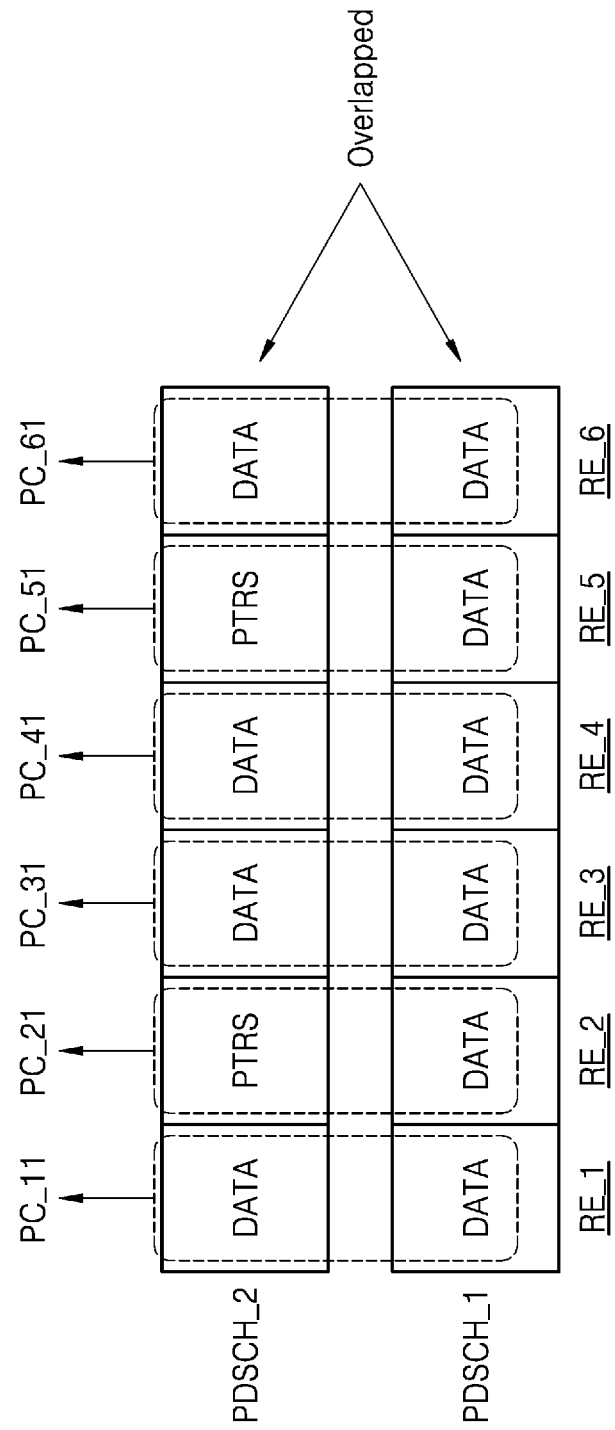
FIG. 5 is a view for describing an operation of a terminal when first and second PDSCHs overlap each other.

FIG. 5 is a view for describing an operation of a terminal when the first and second PDSCHs PDSCH_1 and PDSCH_2 overlap each other according to example embodiments. Hereinafter, it is premised that a PTRS is allocated to a resource area in a constant pattern along a time axis in the same frequency domain, but example embodiments are not limited thereto. Example embodiments may be applied to various patterns of the PTRS.

Referring to FIGS. 1 and 5, the first and second PDSCHs PDSCH_1 and PDSCH_2 may overlap over first to sixth resource elements RE_1 to RE_6. Pieces of data/data may be allocated to the first, third, fourth, and sixth resource elements RE_1, RE_3, RE_4, and RE_6, and data/PTRS may be allocated to the second and fifth resource elements RE_2 and RE_5. It is assumed that pieces of data/data are modulated by the same modulation technique (e.g., 256 quadrature amplitude modulation (QAM)), and pieces of data/PTRS are modulated by different modulation techniques (e.g., 256 QAM for data and quadrature phase shift keying (QPSK) for PTRS). However, this is for convenience of understanding and example embodiments are not limited thereto.

The terminal 100 may perform a first processing operation PC_11 on the pieces of data/data allocated to the first resource element RE_1. In more detail, the terminal 100 may demodulate the pieces of data/data allocated to the first resource element RE_1 by a demodulation method corresponding to the 256 QAM, respectively. The terminal 100 may perform joint detection on the pieces of data/data. Subsequently, the terminal 100 may perform a second processing operation PC_21 on the data/PTRS allocated to the second resource element RE_2. In more detail, in the data/PTRS allocated to the second resource element RE_2, the terminal 100 demodulates the data in the demodulation method corresponding to the 256 QAM, and may perform rate matching on the PTRS. Because the PTRS is a reference signal for phase tracking and is previously used to obtain the quality of a downlink channel, demodulation for the PTRS is unnecessary, and the PTRS may be processed by rate matching. In summary, the terminal 100 may process the data allocated to the second resource element RE_2 in a first manner and may process the PTRS allocated to the second resource element RE_2 in a second manner. A demodulation order combination of a demodulation operation for the pieces of data/data of the first resource element RE_1 performed by the terminal 100 may be different from a demodulation order combination of a demodulation operation for the data/PTRS of the second resource element RE_2.

In some example embodiments, the terminal 100 may perform joint detection on the data/PTRS allocated to the second resource element RE_2, and may demodulate the data/PTRS using demodulation methods respectively corresponding to the 256 QAM and the QPSK. In addition, the terminal 100 may demodulate the data after removing the PTRS allocated to the second resource element RE_2. In addition, in some example embodiments, the terminal 100 may demodulate the data after performing interference whitening on the second resource element RE_2.

That is, because the first processing operation PC_11 and the second processing operation PC_21 have different processing methods and the terminal 100 needs to quickly change the processing methods in order to perform the second processing operation PC_21 on the second resource element RE_2, this change may be a factor that increases the processing complexity of the terminal 100. In addition, in the case of the second processing operation PC_21, because each of the data/PTRS is processed in a heterogeneous manner, the terminal 100 may not support the second processing operation PC_21. This problem may occur when a processing operation is performed on the fourth resource element RE_4 and the fifth resource element RE_5.

Hereinafter, third to sixth processing operations PC_31 to PC_61 for the third to sixth resource elements RE_3 to RE_6 are the same as the first and second processing operations PC_11 and PC_21 described above, and therefore, repeated descriptions thereof will not be given herein.

The first and second cells 110 and 120 according to an example embodiment may reduce the processing complexity of the terminal 100 and operate in a scheduling mode corresponding to the performance of the terminal 100, which will be described later below.

Figure 6A:
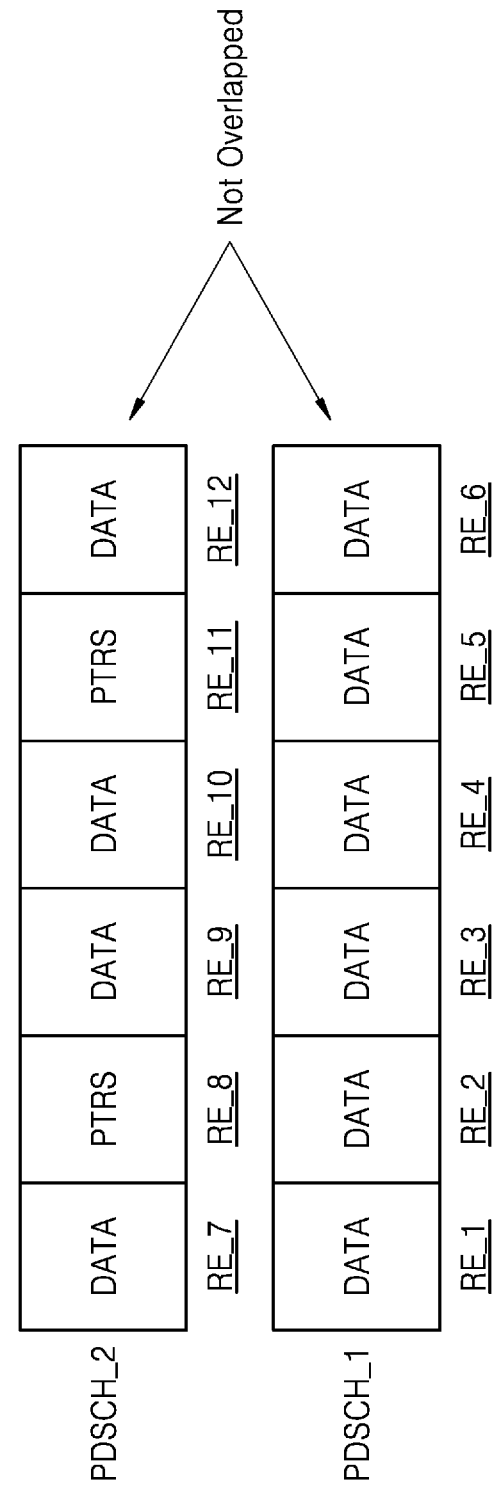
FIGS. 6A, 6B and 6C are views for describing first and second PDSCHs in a plurality of scheduling modes according to example embodiments.
Figure 6B:
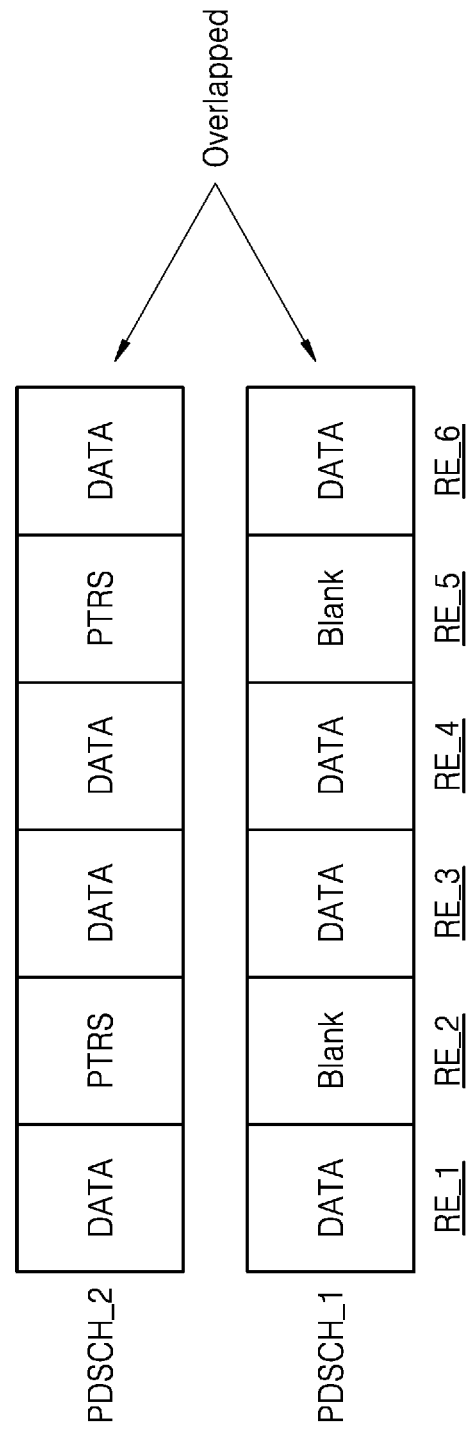
Figure 6C:
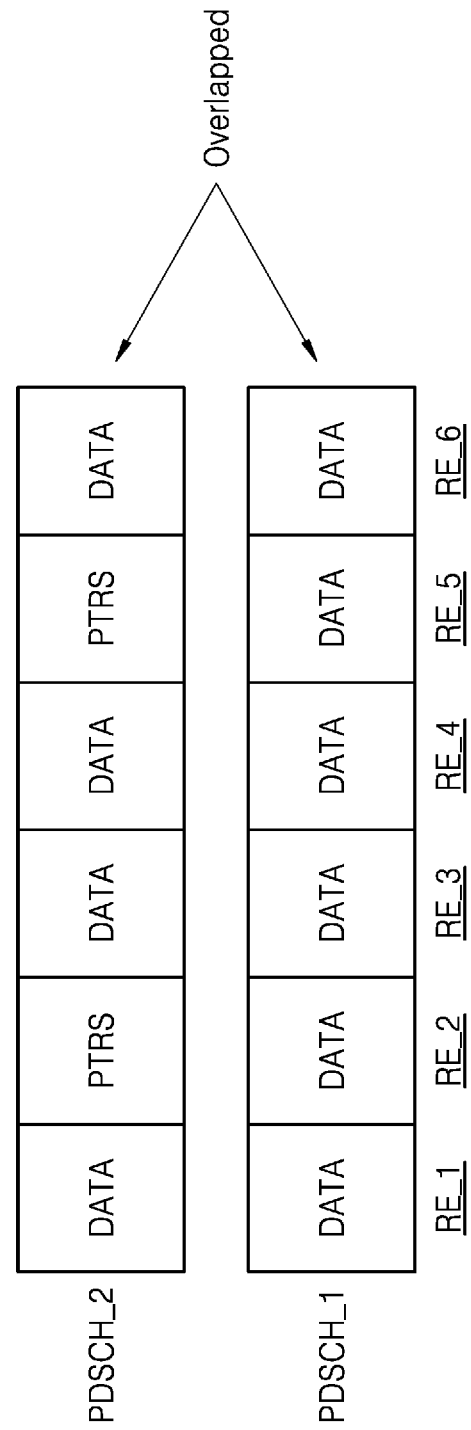

FIGS. 6A to 6C are views for describing the first and second PDSCHs PDSCH_1 and PDSCH_2 in a plurality of scheduling modes according to an example embodiment.

Referring to FIGS. 1 and 6A, the first and second cells 110 and 120 may operate in a first scheduling mode such that a resource element allocated with data and a resource element allocated with PTRS do not overlap each other in the first and second PDSCHs PDSCH_1 and PDSCH_2. Hereinafter, the first and second cells 110 and 120 operating in the first scheduling mode will be described.

In an example embodiment, in order to prevent data/PTRS from being allocated to any resource element, the second cell 120 may schedule resource elements RE_7 to RE_12 corresponding to a frequency domain to which the PTRS of the second PDSCH PDSCH_2 is allocated to not overlap the first PDSCH PDSCH_1. In addition, in order to prevent pieces of PTRS/data from being allocated to any resource element, the first cell 110 may schedule resource elements corresponding to a frequency domain to which the PTRS of the first PDSCH PDSCH_1 is allocated to not overlap the second PDSCH PDSCH_2.

In addition, as an example embodiment, the first and second cells 110 and 120 may perform scheduling as shown in FIG. 3C such that the first PDSCH PDSCH_1 and the second PDSCH PDSCH_2 do not all overlap each other in the frequency domain.

Referring to FIGS. 1 and 6B, the first and second PDSCHs PDSCH_1 and PDSCH_2 may overlap over first to sixth resource elements RE_1 to RE_6. The first and second cells 110 and 120 may operate in a second scheduling mode such that the second and fifth resource elements RE_2 and RE_5 to which data is not allocated and the second and fifth resource elements RE_2 and RE_5 to which PTRS is allocated overlap each other in the first and second PDSCHs PDSCH_1 and PDSCH_2. Hereinafter, the first and second cells 110 and 120 operating in the second scheduling mode will be described.

In an example embodiment, the first cell 110 may not allocate data to the second and fifth resource elements RE_2 and RE_5 to which the PTRS of the second PDSCH PDSCH_2 is allocated. The first cell 110 may allocate non-data through rate matching to the second and fifth resource elements RE_2 and RE_5. The first cell 110 may perform the above operation by obtaining scheduling information about resource elements to which PTRS is allocated from the second cell 120 in advance. The terminal 100 may perform a rate matching operation on non-data/PTRS allocated to the second and fifth resource elements RE_2 and RE_5. That is, as described above, because the PTRS is a reference signal for phase tracking and is previously used to obtain the quality of a downlink channel, demodulation for the PTRS is unnecessary and the PTRS may be processed by rate matching and the non-data may also be processed by rate matching. Like the first cell 110, the second cell 120 may not allocate data to resource elements to which the PTRS of the first PDSCH PDSCH_1 is allocated.

The terminal 100 may lower processing complexity of the terminal 100 compared to FIG. 5 by performing processing on pieces of data/data allocated to the first resource element RE_1 based on demodulation corresponding to a certain modulation method and by performing processing on the non-data/PTRS allocated to the second resource element RE_2 based on relatively simple rate matching. Hereinafter, processing operations for the third to sixth resource elements RE_3 to RE_6 are the same as the processing operations for the first and second resource elements RE_1 and RE_2, and therefore, repeated descriptions thereof will not be given herein.

Referring to FIGS. 1 and 6C, the first and second PDSCHs PDSCH_1 and PDSCH_2 may overlap over the first to sixth resource elements RE_1 to RE_6. The first and second cells 110 and 120 may operate in a third scheduling mode in which pieces of data/data are allocated to the first, third, fourth, and sixth resource elements RE_1, RE_3, RE_4, and RE_6, and pieces of data/PTRS are allocated to the second and fifth resource elements RE_2 and RE_5. Hereinafter, the first and second cells 110 and 120 operating in the third scheduling mode will be described.

In an example embodiment, the first cell 110 may allocate data to the second and fifth resource elements RE_2 and RE_5 to which the PTRS of the second PDSCH PDSCH_2 is allocated. The terminal 100 may perform demodulation operations on pieces of data/data allocated to the first, third, fourth, and sixth resource elements RE_1, RE_3, RE_4, and RE_6, respectively, and may process pieces of data/PTRS allocated to the second and fifth resource elements RE_2 and RE_5 in a heterogeneous manner such as a demodulation operation and rate matching, respectively. The second cell 120 may also allocate data to resource elements to which the PTRS of the first PDSCH PDSCH_1 is allocated.

The first and second cells 110 and 120 may operate in the third scheduling mode after confirming that the terminal 100 may support processing in a heterogeneous manner for data/PTRS. In some example embodiments, even when it is confirmed that the terminal 100 may support all types of processing, the first and second cells 110 and 120 may operate in the first scheduling mode of FIG. 6A or the second scheduling mode of FIG. 6B according to a communication environment.

Figure 7:
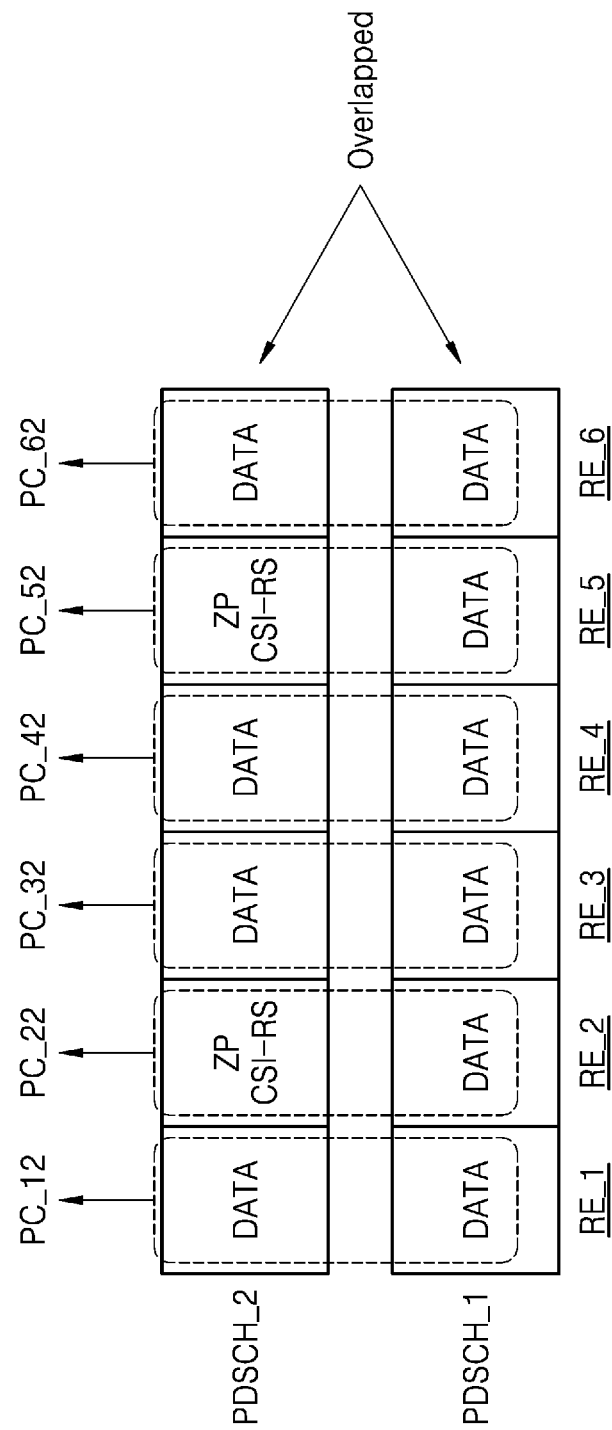
FIG. 7 is a view for describing an operation of a terminal when first and second PDSCHs overlap each other.

FIG. 7 is a view for describing an operation of a terminal when the first and second PDSCHs PDSCH_1 and PDSCH_2 overlap each other. Hereinafter, it is premised that ZP CSI-RS is allocated to a resource area in a constant pattern along a time axis in the same frequency domain, but example embodiments are not limited thereto. Example embodiments include various patterns of ZP CSI-RS.

Referring to FIGS. 1 and 7, the first and second PDSCHs PDSCH_1 and PDSCH_2 may overlap over the first to sixth resource elements RE_1 to RE_6. Pieces of data/data may be allocated to the first, third, fourth, and sixth resource elements RE_1, RE_3, RE_4, and RE_6, and pieces of data/ZP CSI-RS may be allocated to the second and fifth resource elements RE_2 and RE_5.

The terminal 100 may perform a first processing operation PC_12 on the pieces of data/data allocated to the first resource element RE_1. In more detail, the terminal 100 may demodulate the pieces of data/data allocated to the first resource element RE_1 by a demodulation method corresponding to the 256 QAM, respectively. The terminal 100 may perform joint detection on the pieces of data/data. Subsequently, the terminal 100 may perform a second processing operation PC_22 on the pieces of data/ZP CSI-RS allocated to the second resource element RE_2. In more detail, in the pieces of data/ZP CSI-RS allocated to the second resource element RE_2, the terminal 100 demodulates the data in the demodulation method corresponding to the 256 QAM, and may perform rate matching on the ZP CSI-RS. Because the ZP CSI-RS was previously used to obtain the quality of the downlink channel, demodulation for the ZP CSI-RS is unnecessary, so the ZP CSI-RS may be processed by rate matching. In summary, the terminal 100 may process the data allocated to the second resource element RE_2 in a first manner, and may process the ZP CSI-RS allocated to the second resource element RE_2 in a second manner. A demodulation order combination of a demodulation operation for the pieces of data/data of the first resource element RE_1 performed by the terminal 100 may be different from a demodulation order combination of a demodulation operation for the pieces of data/ZP CSI-RS of the second resource element RE_2.

That is, because a first processing operation PC_21 and a second processing operation PC_22 have different processing methods and the terminal 100 needs to quickly change the processing methods in order to perform the second processing operation PC_22 on the second resource element RE_2, this change may be a factor that increases the processing complexity of the terminal 100. In addition, in the case of the second processing operation PC_22, because each of the pieces of data/ZP CSI-RS is processed in a heterogeneous manner, the terminal 100 may not support the second processing operation PC_22. Hereinafter, third to sixth processing operations PC_32 to PC_62 for the third to sixth resource elements RE_3 to RE_6 are the same as the first and second processing operations PC_21 and PC_22 described above, and therefore, repeated descriptions thereof will not be given herein.

The first and second cells 110 and 120 according to an example embodiment may reduce the processing complexity of the terminal 100 and operate in a scheduling mode corresponding to the performance of the terminal 100, which will be described later below.

Figure 8A:
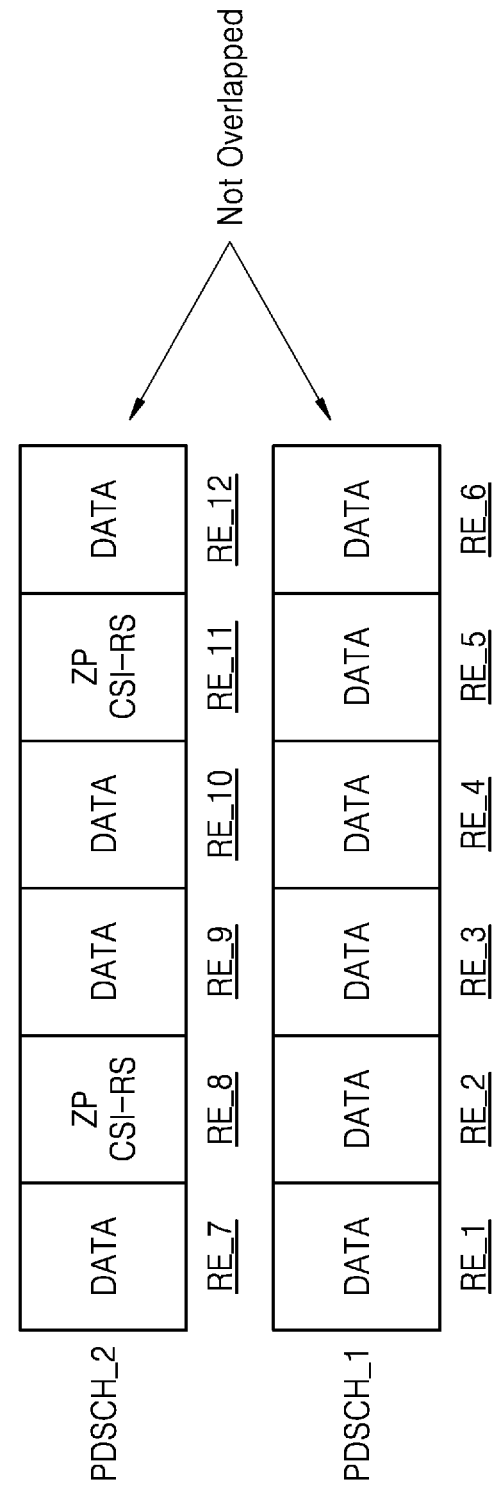
FIGS. 8A, 8B and 8C are views for describing first and second PDSCHs in a plurality of scheduling modes according to example embodiments.
Figure 8B:
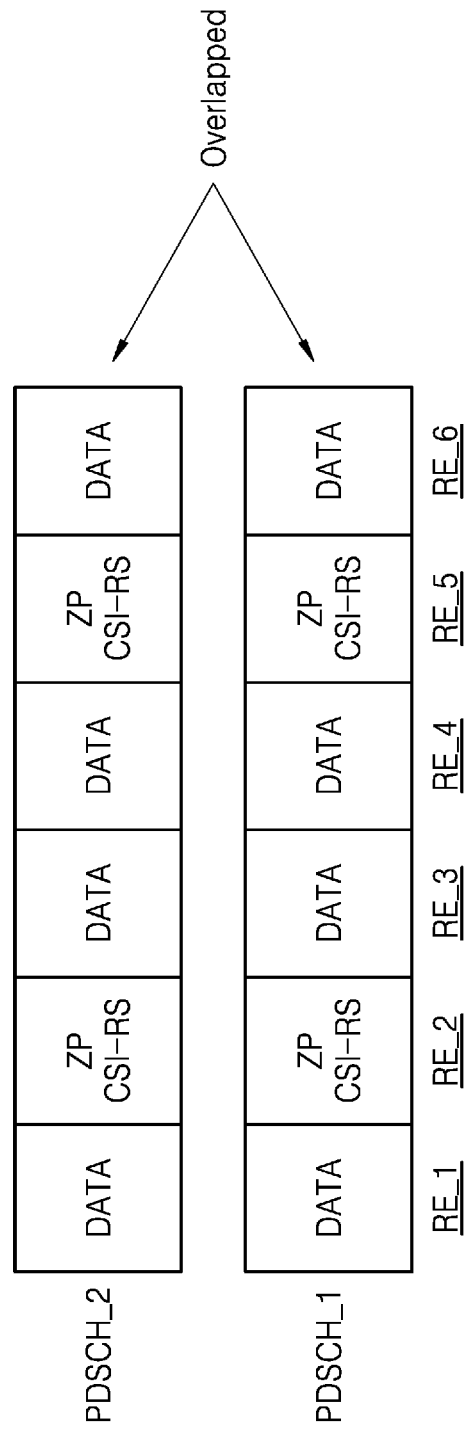
Figure 8C:
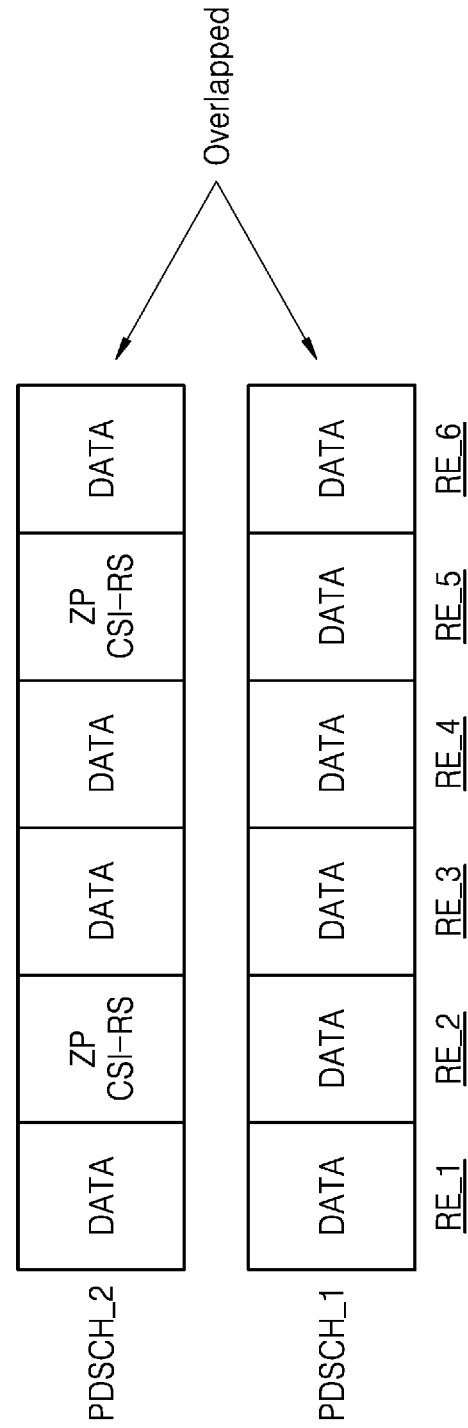

FIGS. 8A to 8C are views for describing the first and second PDSCHs PDSCH_1 and PDSCH_2 in a plurality of scheduling modes according to an example embodiment.

Referring to FIGS. 1 and 8A, the first and second cells 110 and 120 may operate in a first scheduling mode such that a resource element allocated with data and a resource element allocated with ZP CSI-RS do not overlap each other in the first and second PDSCHs PDSCH_1 and PDSCH_2. Hereinafter, the first and second cells 110 and 120 operating in the first scheduling mode will be described.

In an example embodiment, in order to prevent pieces of data/ZP CSI-RS from being allocated to any resource element, the second cell 120 may schedule the resource elements RE_7 to RE_12 corresponding to a frequency domain to which the ZP CSI-RS of the second PDSCH PDSCH_2 is allocated to not overlap the first PDSCH PDSCH_1. In addition, in order to prevent ZP CSI-RS/data from being allocated to any resource element, the first cell 110 may also schedule resource elements corresponding to a frequency domain to which the ZP CSI-RS of the first PDSCH PDSCH_1 is allocated to not overlap the second PDSCH PDSCH_2. In addition, as an example embodiment, the first and second cells 110 and 120 may perform scheduling as shown in FIG. 3C such that the first PDSCH PDSCH_1 and the second PDSCH PDSCH_2 do not all overlap each other.

Referring to FIGS. 1 and 8B, the first and second PDSCHs PDSCH_1 and PDSCH_2 may overlap over the first to sixth resource elements RE_1 to RE_6. The first and second cells 110 and 120 may operate in a second scheduling mode such that the second to fifth resource elements RE_2 and RE_5 to which data is not allocated and the second to fifth resource elements RE_2 and RE_5 to which ZP CSI-RS is allocated overlap each other in the first and second PDSCHs PDSCH_1 and PDSCH_2. Hereinafter, the first and second cells 110 and 120 operating in the second scheduling mode will be described.

In an example embodiment, the first cell 110 may not allocate data to the second and fifth resource elements RE_2 and RE_5 to which the ZP CSI-RS of the second PDSCH PDSCH_2 is allocated. The first cell 110 may allocate non-data through rate matching to the second and fifth resource elements RE_2 and RE_5. The first cell 110 may perform the above operation by obtaining scheduling information about resource elements to which ZP CSI-RS is allocated from the second cell 120 in advance. The terminal 100 may perform a rate matching operation on non-data/ZP CSI-RS allocated to the second and fifth resource elements RE_2 and RE_5. Like the first cell 110, the second cell 120 may not allocate data to resource elements to which the PTRS of the first PDSCH PDSCH_1 is allocated.

The terminal 100 may lower processing complexity of the terminal 100 compared to FIG. 7 by performing processing on pieces of data/data allocated to the first resource element RE_1 based on demodulation corresponding to a certain modulation method and by performing processing on the non-data/ZP CSI-RS allocated to the second resource element RE_2 based on relatively simple rate matching. Hereinafter, processing operations for the third to sixth resource elements RE_3 to RE_6 are the same as the processing operations for the first and second resource elements RE_1 and RE_2, and therefore, repeated descriptions thereof will not be given herein.

Referring to FIGS. 1 and 8C, the first and second PDSCHs PDSCH_1 and PDSCH_2 may overlap over the first to sixth resource elements RE_1 to RE_6. The first and second cells 110 and 120 may operate in a third scheduling mode in which pieces of data/data are allocated to the first, third, fourth, and sixth resource elements RE_1, RE_3, RE_4, and RE_6, and pieces of data/ZP CSI-RS are allocated to the second and fifth resource elements RE_2 and RE_5. Hereinafter, the first and second cells 110 and 120 operating in the third scheduling mode will be described.

In an example embodiment, the first cell 110 may allocate data to the second and fifth resource elements RE_2 and RE_5 to which the ZP CSI-RS of the second PDSCH PDSCH_2 is allocated. The terminal 100 may perform demodulation operations on pieces of data/data allocated to the first, third, fourth, and sixth resource elements RE_1, RE_3, RE_4, and RE_6, respectively, and may process pieces of data/ZP CSI-RS allocated to the second and fifth resource elements RE_2 and RE_5 in a heterogeneous manner such as a demodulation operation and rate matching, respectively. The second cell 120 may also allocate data to resource elements to which the ZP CSI-RS of the first PDSCH PDSCH_1 is allocated.

The first and second cells 110 and 120 may operate in the third scheduling mode after confirming that the terminal 100 may support processing in a heterogeneous manner for pieces of data/ZP CSI-RS. In some example embodiments, even when it is confirmed that the terminal 100 may support all types of processing, the first and second cells 110 and 120 may operate in the first scheduling mode of FIG. 8A or the second scheduling mode of FIG. 8B according to a communication environment.

Figure 9:
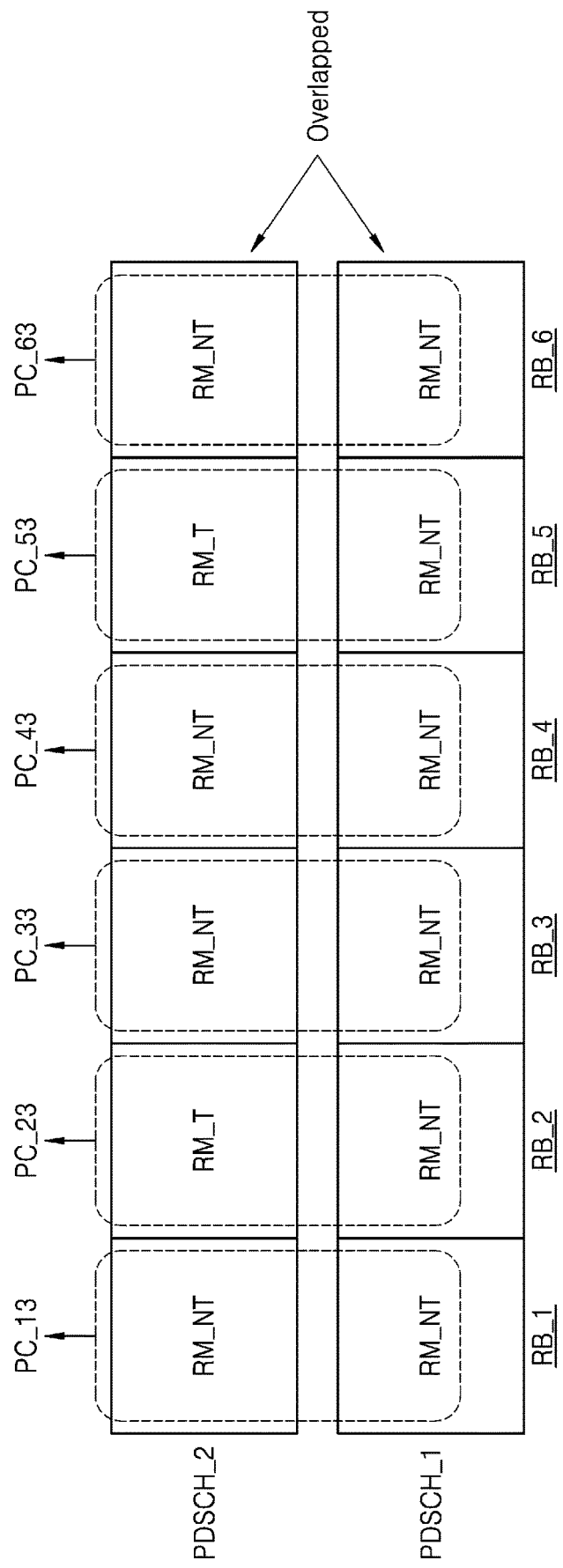
FIG. 9 is a view for describing an operation of a terminal when first and second PDSCHs overlap each other.

FIG. 9 is a view for describing an operation of a terminal when the first and second PDSCHs PDSCH_1 and PDSCH_2 overlap each other. Hereinafter, it is assumed that a terminal schedules the first and second PDSCHs PDSCH_1 and PDSCH_2 such that rate matching may be performed in units of resource blocks, but example embodiments are not limited thereto. Even when rate matching is performed in various resource units, example embodiments may be applied.

Referring to FIGS. 1 and 9, the first and second PDSCHs PDSCH_1 and PDSCH_2 may overlap over first to sixth resource blocks RB_1 to RB_6. Data not subjected to rate matching may be referred to as RM_NT. Data subjected to rate matching may be referred to as RM_T. RM_NT/RM_NT may be allocated to the first, third, fourth, and sixth resource blocks RB_1, RB_3, RB_4, and RB_6, and RM_NT/RM_T may be allocated to the second and fifth resource blocks RB_2 and RB_5. The RM_T may include pieces of data to be subjected to a demodulation operation, and the RM_NT may include non-data to be subjected to rate matching.

The terminal 100 may perform a first processing operation PC_13 on RM_NT/RM_NT allocated to the first resource block RB_1. In more detail, the terminal 100 may demodulate the RM_NT/RM_NT allocated to the first resource block RB_1 by a demodulation method corresponding to a modulation method, respectively. Subsequently, the terminal 100 may perform a second processing operation PC_23 on the RM_NT/RM_T allocated to the second resource block RB_2. For example, in the RM_NT/RM_T allocated to the second resource block RB_2, the terminal 100 demodulates the RM_NT in the demodulation method corresponding to the 256 QAM, and may perform rate matching on the RM_T. In summary, the terminal 100 may process the RM_NT allocated to the second resource block RB_2 in a first manner and the RM_T allocated to the second resource block RB_2 in a second manner.

That is, because the first processing operation PC_13 and the second processing operation PC_23 have different processing methods and the terminal 100 needs to quickly change the processing methods in order to perform the second processing operation PC_23 on the second resource block RB_2, this change may be a factor that increases the processing complexity of the terminal 100. In addition, in the case of the second processing operation PC_23, because each of the RM_NT/RM_T is processed in a heterogeneous manner, the terminal 100 may not support the second processing operation PC_23. This problem may occur when a processing operation is performed on the fourth resource block RB_4 and the fifth resource block RB_5.

Hereinafter, third to sixth processing operations PC_33 to PC_63 for the third to sixth resource blocks RB_3 to RB_6 are the same as the first and second processing operations PC_13 and PC_23 described above, and therefore, repeated descriptions thereof will not be given herein.

The first and second cells 110 and 120 according to an example embodiment may reduce the processing complexity of the terminal 100 and operate in a scheduling mode corresponding to the performance of the terminal 100, which will be described later below.

Figure 10A:
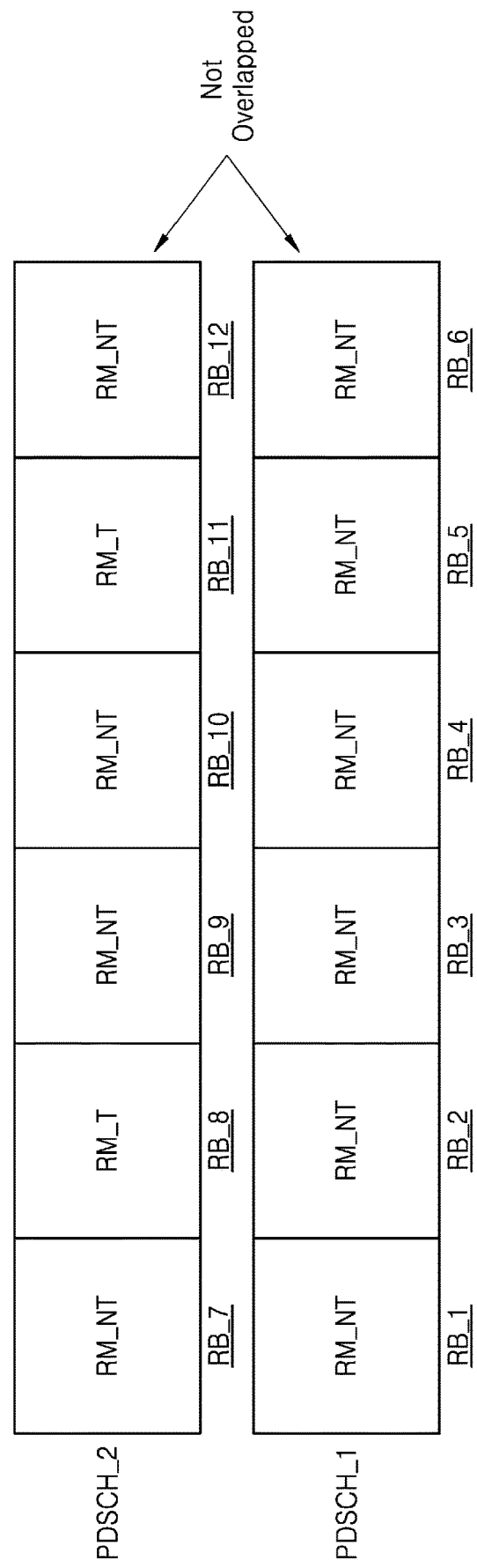
FIGS. 10A, 10B and 10C are views for describing first and second PDSCHs in a plurality of scheduling modes according to example embodiments.
Figure 10B:
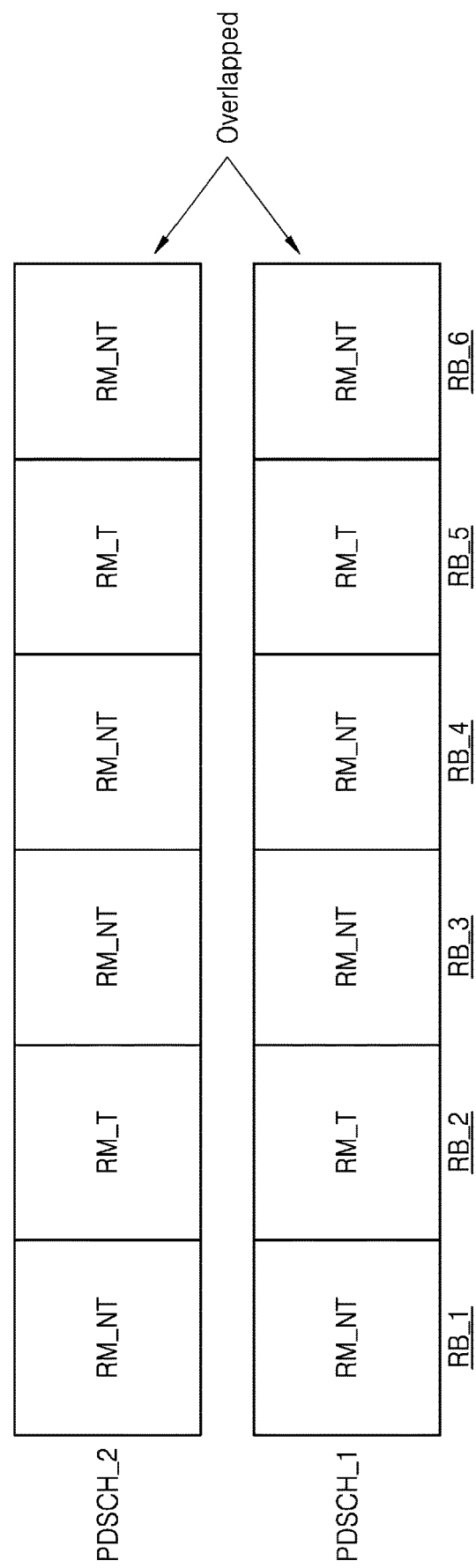
Figure 10C:
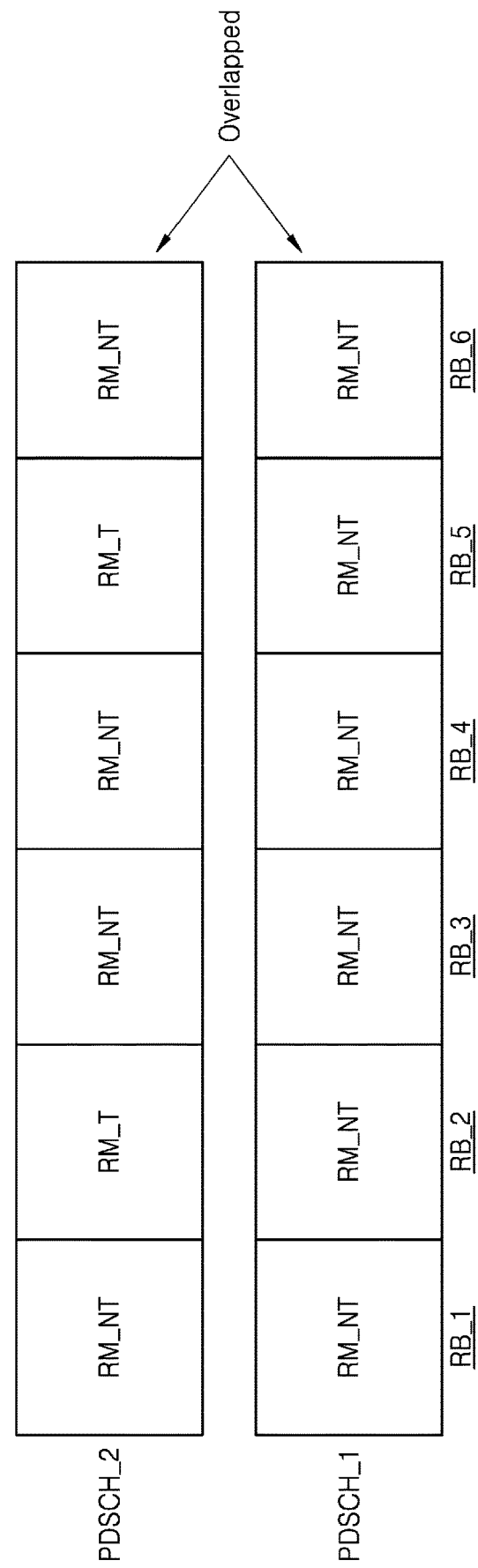

FIGS. 10A to 10C are views for describing the first and second PDSCHs PDSCH_1 and PDSCH_2 in a plurality of scheduling modes according to an example embodiment.

Referring to FIGS. 1 and 10A, the first and second cells 110 and 120 may operate in a first scheduling mode such that a resource block allocated with RM_NT and a resource block allocated with RM_T do not overlap each other in the first and second PDSCHs PDSCH_1 and PDSCH_2. Hereinafter, the first and second cells 110 and 120 operating in the first scheduling mode will be described.

In an example embodiment, in order to prevent RM_NT/RM_T from being allocated to any resource block, the second cell 120 may schedule the second and fifth resource blocks RB_2 and RB_5 corresponding to a frequency domain to which the RM_T of the second PDSCH PDSCH_2 is allocated to not overlap the first PDSCH PDSCH_1. In addition, in order to prevent RM_T/RM_NT from being allocated to any resource block, the first cell 110 may also schedule resource blocks corresponding to a frequency domain to which the RM_T of the first PDSCH PDSCH_1 is allocated to not overlap the second PDSCH PDSCH_2.

In addition, as an example embodiment, the first and second cells 110 and 120 may perform scheduling as shown in FIG. 3C such that the first PDSCH PDSCH_1 and the second PDSCH PDSCH_2 do not all overlap each other.

Referring to FIGS. 1 and 10B, the first and second PDSCHs PDSCH_1 and PDSCH_2 may overlap over the first to sixth resource blocks RB_1 to RB_6. The first and second cells 110 and 120 may operate in a second scheduling mode such that the second and fifth resource blocks RB_2 and RB_5 to which PM_T is allocated and the second and fifth resource blocks RB_2 and RB_5 to which PM_T is allocated overlap each other in the first and second PDSCHs PDSCH_1 and PDSCH_2. Hereinafter, the first and second cells 110 and 120 operating in the second scheduling mode will be described.

In an example embodiment, the first cell 110 may allocate RM_T to the second and fifth resource blocks RB_2 and RB_5 to which the RM_T of the second PDSCH PDSCH_2 is allocated. The first cell 110 may perform the above operation by obtaining scheduling information about resource blocks to which PM_T is allocated from the second cell 120 in advance. The terminal 100 may perform a rate matching operation on RM_T/RM_T allocated to the second and fifth resource blocks RB_2 and RB_5. Like the first cell 110, the second cell 120 may also allocate RM_T to resource blocks to which the RM_T of the first PDSCH PDSCH_1 is allocated.

The terminal 100 may lower processing complexity of the terminal 100 compared to FIG. 9 by performing processing on RM_NT/RM_NT allocated to the first resource block RB_1 based on demodulation corresponding to a certain modulation method and by performing processing on the RM_T/RM_T allocated to the second resource block RB_2 based on relatively simple rate matching. Hereinafter, processing operations for the third to sixth resource blocks RB_3 to RB_6 are the same as the processing operations for the first and second resource blocks RB_1 and RB_2, and therefore, repeated descriptions thereof will not be given herein.

Referring to FIGS. 1 and 10C, the first and second PDSCHs PDSCH_1 and PDSCH_2 may overlap over the first to sixth resource blocks RB_1 to RB_6. The first and second cells 110 and 120 may operate in a third scheduling mode in which RM_NT/RM_NT are allocated to the first, third, fourth, and sixth resource blocks RB_1, RB_3, RB_4, and RB_6, and RM_NT/RM_T are allocated to the second and fifth resource blocks RB_2 and RB_5. Hereinafter, the first and second cells 110 and 120 operating in the third scheduling mode will be described.

In an example embodiment, the first cell 110 may allocate RM_NT to the second and fifth resource blocks RB_2 and RB_5 to which the RM_T of the second PDSCH PDSCH_2 is allocated. The terminal 100 may perform demodulation operations on RM_NT/RM_NT allocated to the first, third, fourth, and sixth resource blocks RB_1, RB_3, RB_4, and RB_6, respectively, and may process RM_NT/RM_T allocated to the second and fifth resource blocks RB_2 and RB_5 in a heterogeneous manner such as a demodulation operation and rate matching, respectively. The second cell 120 may also allocate data to resource blocks to which the RM_T of the first PDSCH PDSCH_1 is allocated.

The first and second cells 110 and 120 may operate in the third scheduling mode after confirming that the terminal 100 may support processing in a heterogeneous manner for RM_NT/RM_T. In some example embodiments, even when it is confirmed that the terminal 100 may support various types of processing, the first and second cells 110 and 120 may operate in the first scheduling mode of FIG. 10A or the second scheduling mode of FIG. 10B according to a communication environment.

In addition, in an example embodiment, the first and second cells 110 and 120 may limit the number of resource blocks allocated to RM_NT/RM_T or RM_T/RM_NT. For example, the first and second cells operate based on the third scheduling mode, and when the number of resource blocks allocated to the RM_NT/RM_T or the RM_T/RM_NT exceeds a threshold value, may operate in the first scheduling mode of FIG. 10A or the second scheduling mode of FIG. 10B. The threshold may be adjusted according to the performance of the terminal 100, and when the number of resource blocks allocated to the RM_NT/RM_T or the RM_T/RM_NT exceeds a threshold value, the terminal 100 may notify the first and second cells 110 and 120 of this. In some example embodiments, the first and second cells 110 and 120 may operate in the first scheduling mode of FIG. 10A or the second scheduling mode of FIG. 10B by self-recognizing that the number of resource blocks allocated to the RM_NT/RM_T or the RM_T/RM_NT exceeds a threshold value even without notification from the terminal 100.

According to an example embodiment, the first and second cells 110 and 120 may perform scheduling operations of the first and second PDSCHs PDSCH_1 and PDSCH_2 by adjusting the value of a DCI field according to the plurality of scheduling modes shown in FIGS. 10A to 10C.

Figure 11:
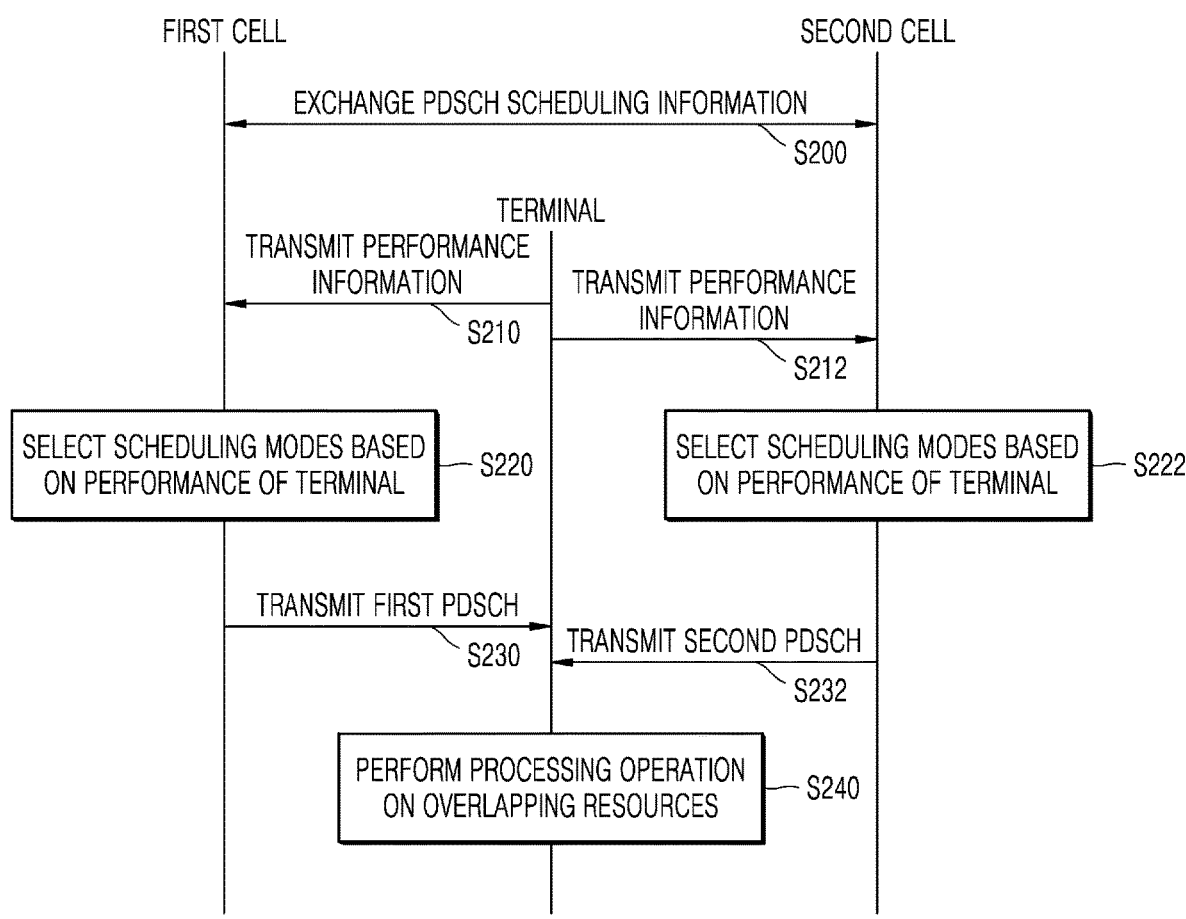
FIG. 11 is a flowchart illustrating a method of operating a wireless communication system according to an example embodiment.

FIG. 11 is a flowchart illustrating a method of operating a wireless communication system according to an example embodiment.

Referring to FIG. 11, in operation S200, a first cell and a second cell may exchange respective PDSCH scheduling information. In operations S210 and S212, a terminal may transmit performance information to the first cell and the second cell, respectively. In operations S220 and S222, the first and second cells may select scheduling modes for first and second PDSCHs, respectively, based on the performance of the terminal. In operations S230 and S232, the first and second cells may respectively transmit the first and second PDSCHs scheduled in the selected scheduling modes to the terminal. In operation S240, the terminal may perform a processing operation on overlapping resources of the first and second PDSCHs.

Figure 12A:
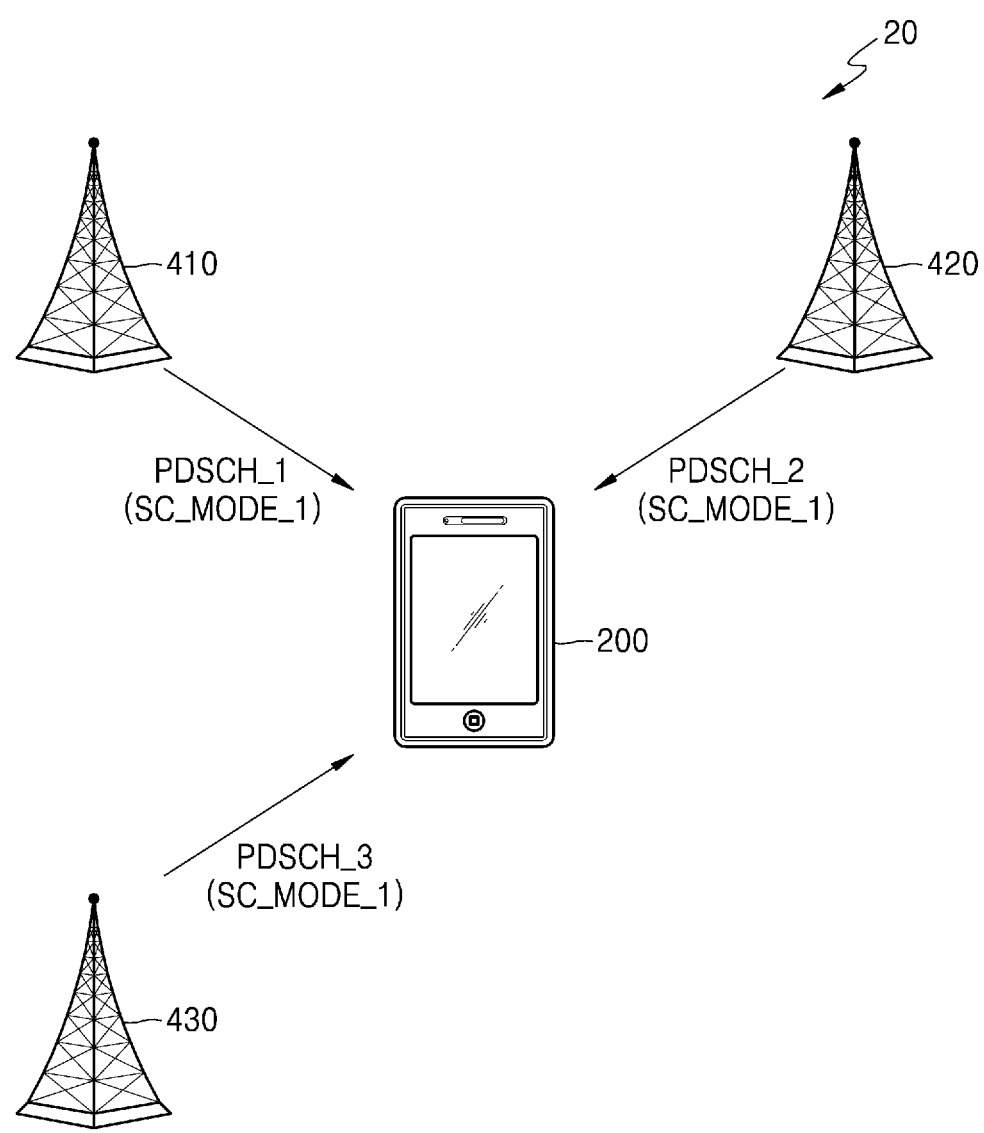
FIGS. 12A, 12B and 12C are views for illustrating a method of operating a wireless communication system according to example embodiments.
Figure 12B:
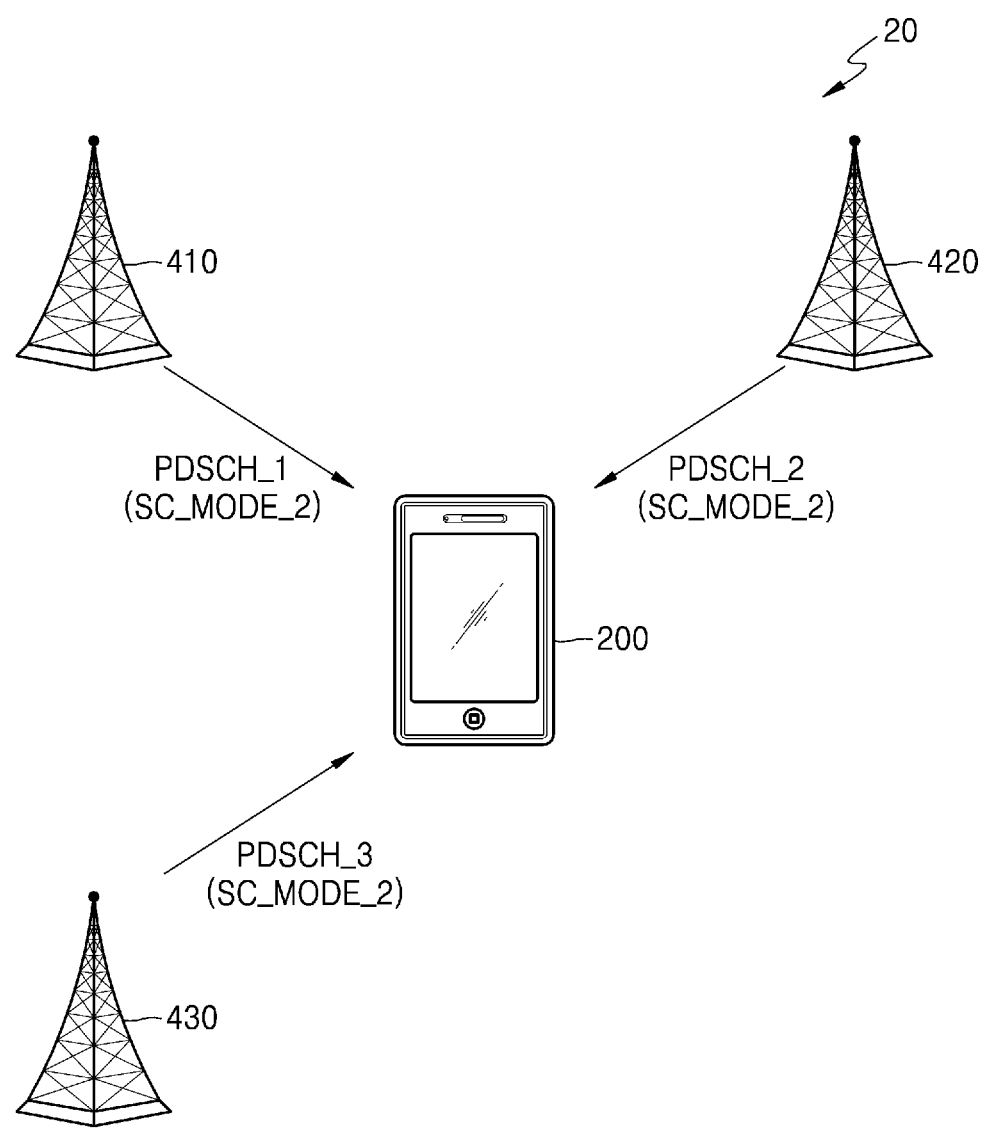
Figure 12C:
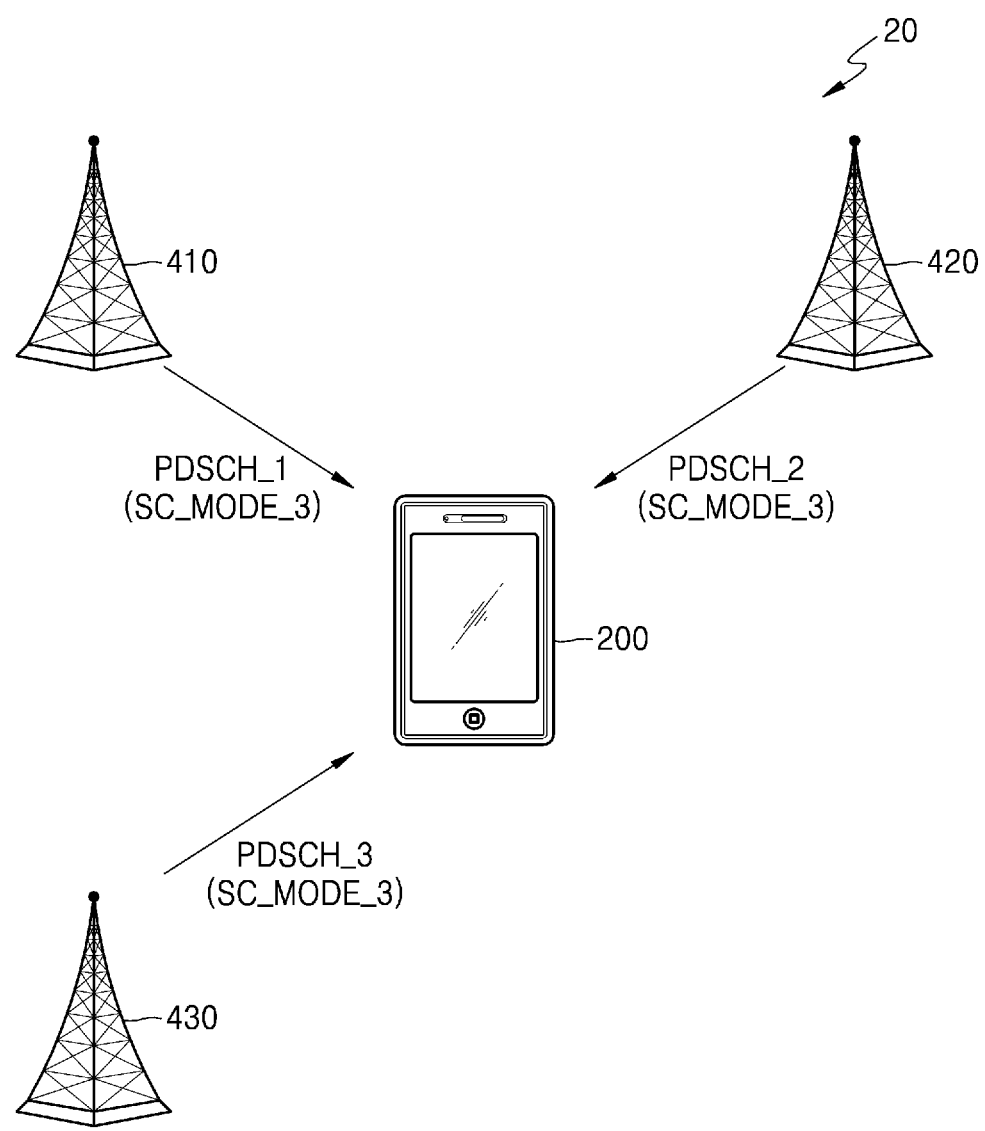

FIGS. 12A to 12C are views for illustrating a method of operating a wireless communication system 20 according to an example embodiment.

Referring to FIG. 12A, the wireless communication system 20 may include a terminal 200 and first to third cells 410 to 430. The first to third cells 410 to 430 may select a first scheduling mode SC_MODE_1 to schedule first to third PDSCHs PDSCH_1 to PDSCH_3 based on the first scheduling mode SC_MODE_1, and then transmit the first to third PDSCHs PDSCH_1 to PDSCH_3 to the terminal 200. The first scheduling mode SC_MODE_1 has been described with respect to FIGS. 6A, 8A, and 10A, and the terminal 200 may perform processing (e.g., joint detection) on overlapping resources considering that pieces of data/data or RM_NT/RM_NT are allocated to resources overlapped by the first to third PDSCHs PDSCH_1 to PDSCH_3. In some example embodiments, the terminal 200 may perform general processing considering not including overlapping resources in the first to third PDSCHs PDSCH_1 to PDSCH_3.

Referring to FIG. 12B, the first to third cells 410 to 430 may select a second scheduling mode SC_MODE_2 to schedule the first to third PDSCHs PDSCH_1 to PDSCH_3 based on the second scheduling mode SC_MODE_2, and then transmit the first to third PDSCHs PDSCH_1 to PDSCH_3 to the terminal 200. The second scheduling mode SC_MODE_2 has been described with respect to FIGS. 6B, 8B, and 10B, and the terminal 200 may perform processing (e.g., rate matching) on overlapping resources considering that non-data/PTRS or non-data/ZP CSI-RS or RM_T/RM_T are allocated to the resources overlapped in the first to third PDSCHs PDSCH_1 to PDSCH_3.

Referring to FIG. 12C, the first to third cells 410 to 430 may select a third scheduling mode SC_MODE_3 to schedule the first to third PDSCHs PDSCH_1 to PDSCH_3 based on the third scheduling mode SC_MODE_3, and then transmit the first to third PDSCHs PDSCH_1 to PDSCH_3 to the terminal 200. The third scheduling mode SC_MODE_3 has been described with respect to FIGS. 6C, 8C, and 10C, and the terminal 200, considering that data/PTRS or data/ZP CSI-RS or RM_NT/RM_T are allocated to the resources overlapped in the first to third PDSCHs PDSCH_1 to PDSCH_3, may perform processing (e.g., modulation operation and rate matching) on overlapping resources.

Figure 13:
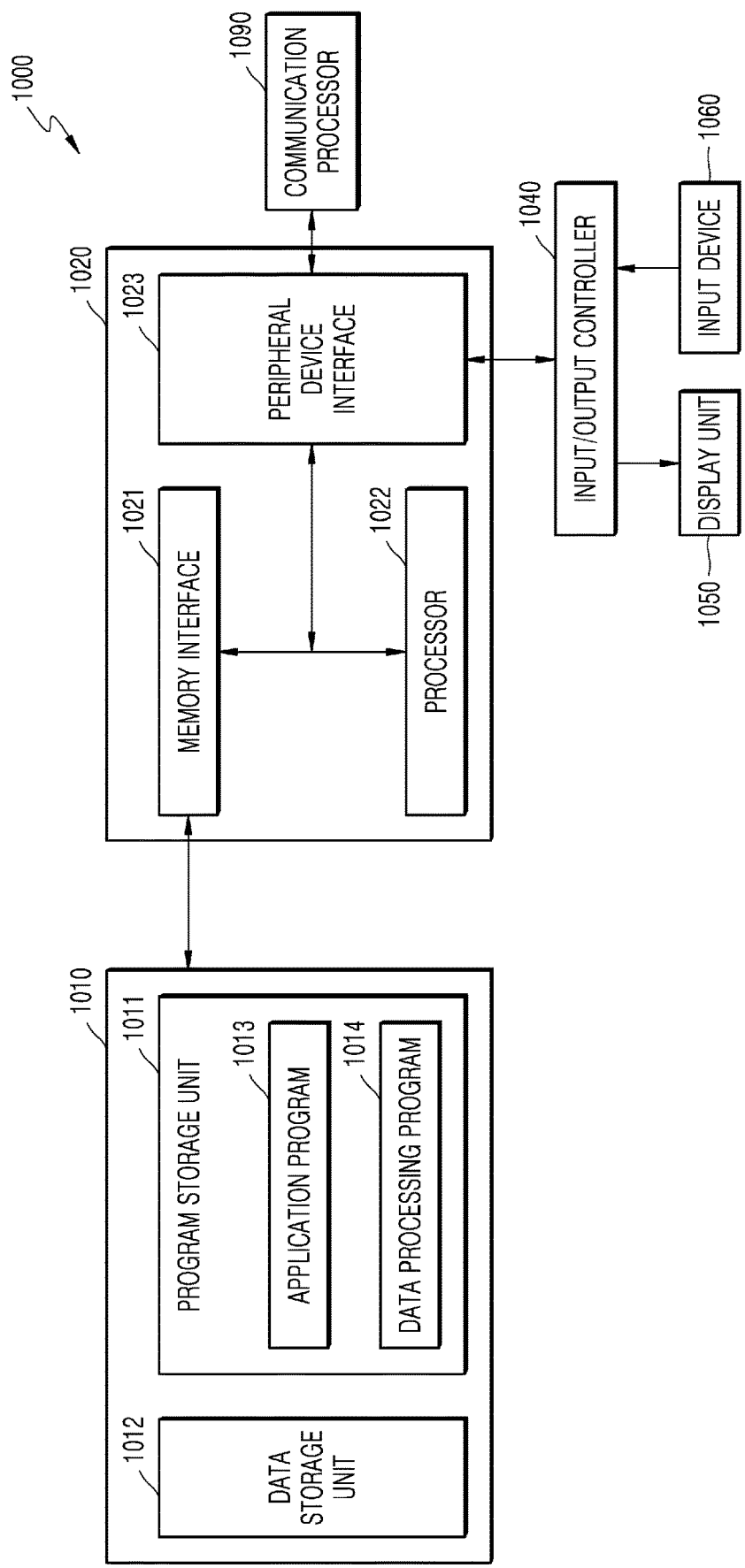
FIG. 13 is a block diagram of an electronic device according to an example embodiment.

FIG. 13 is a block diagram of an electronic device 1000 according to an example embodiment.

Referring to FIG. 13, the electronic device 1000 may include a memory 1010, a processor unit 1020, an input/output controller 1040, a display unit 1050, an input device 1060, and a communication processor 1090. Here, a plurality of memories 1010 may be included. The components are discussed in more detail below.

The memory 1010 may include a program storage unit 1011 for storing a program for controlling operations of the electronic device and a data storage unit 1012 for storing data generated during program execution. The data storage unit 1012 may store data necessary for operations of an application program 1013 and a data processing program 1014. The program storage unit 1011 may include the application program 1013 and the data processing program 1014. Here, the program included in the program storage unit 1011 is a set of instructions, which may be expressed as an instruction set. The application program 1013 includes an application program running on the electronic device. That is, the application program 1013 may include instructions of an application driven by a processor 1022.

The electronic device 1000 may include the communication processor 1090 that performs a communication function for voice communication and data communication. In an example embodiment, the communication processor 1090 may include a radio frequency integrated circuit (RFIC) and a plurality of antennas, and the RFIC may receive PDSCHs based on a selected scheduling mode from among a plurality of scheduling modes related to rate matching of PDSCHs from a plurality of cells. The data processing program 1014 may include an instruction driven by the processor 1022 (or a baseband processor) to perform processing on the PDSCHs based on the selected scheduling mode from among a plurality of scheduling modes, according to example embodiments. That is, the processor 1022 may perform an operation based on the data processing program 1014. Detailed information about this is described in FIGS. 1 to 12C and will be omitted below.

A peripheral device interface 1023 may control a connection between an input/output peripheral device of a cell and the processor 1022 and a memory interface 1021. The processor 1022 controls a plurality of cells to provide corresponding services using at least one software program. The processor 1022 may execute at least one program stored in the memory 1010 to provide a service corresponding to the program.

The input/output controller 1040 may provide an interface between an input/output device such as the display unit 1050 and the input device 1060 and the peripheral device interface 1023. The display unit 1050, which may include a display panel, displays state information, input characters, moving pictures, still pictures, and the like. For example, the display unit 1050 may display application program information driven by the processor 1022.

The input device 1060 may provide input data generated by selection of the electronic device to the processor unit 1020 through the input/output controller 1040. The input device 1060 may include a keypad including at least one hardware button and a touchpad for sensing touch information. For example, the input device 1060 may include a touch layer that is provided over the display panel of the display unit 1050. For example, the input device 1060 may provide touch information such as a touch, a touch movement, and a touch release sensed through a touchpad to the processor 1022 through the input/output controller 1040.

While example embodiments have been particularly shown and described, it will be understood that various changes in form and details may be made therein without departing from the spirit and scope of the following claims.

What is claimed is:

1. A wireless communication system comprising:
    a first cell configured to communicate with a second cell and a terminal,
    wherein the first cell comprises a processor configured to control the first cell to:
        select one of a plurality of scheduling modes related to rate matching of physical downlink shared channels (PDSCHs) based on control information exchanged with the second cell and performance information received from the terminal that indicates whether the terminal supports heterogeneous processing operations on resources allocated with a reference signal overlapping with resources allocated with data; and
        transmit a first PDSCH to the terminal according to the selected scheduling mode while the second cell transmits a second PDSCH to the terminal according to the selected scheduling mode, and
    wherein the terminal is configured to perform processing on the first PDSCH and the second PDSCH based on the selected scheduling mode.

2. The wireless communication system of claim 1, wherein, the processor of the first cell is further configured to, based on a first scheduling mode being selected from among the plurality of scheduling modes, perform scheduling with the second cell in which:
    a resource corresponding to a phase tracking reference signal (PTRS) or an aperiodic zero power channel status Information-reference signal (ZP CSI-RS) included in the first PDSCH does not overlap with a resource corresponding to data included in the second PDSCH, and
    a resource corresponding to a PTRS or an aperiodic ZP CSI-RS included in the second PDSCH does not overlap with a resource corresponding to data included in the first PDSCH.

3. The wireless communication system of claim 1, wherein, the processor of the first cell is further configured to, based on a second scheduling mode being selected from among the plurality of scheduling modes, perform scheduling with the second cell in which:
    data is not allocated to a resource overlapping a first resource corresponding to a phase tracking reference signal (PTRS) or an aperiodic zero power channel status Information-reference signal (ZP CSI-RS) included in the second PDSCH from among resources of the first PDSCH, and
    data is not allocated to a resource overlapping a second resource corresponding to a PTRS or an aperiodic ZP CSI-RS included in the first PDSCH from among resources of the second PDSCH.

4. The wireless communication system of claim 3, wherein the terminal is configured to perform a rate matching operation on the first resource and the second resource.

5. The wireless communication system of claim 1, wherein, the processor of the first cell is further configured to, based on a third scheduling mode being selected from among the plurality of scheduling modes, perform scheduling with the second cell in which:
    first data is allocated to a resource overlapping a first resource corresponding to a phase tracking reference signal (PTRS) or an aperiodic zero power channel status Information-reference signal (ZP CSI-RS) included in the second PDSCH from among resources of the first PDSCH, and
    second data is allocated to a resource overlapping a second resource corresponding to a PTRS or an aperiodic ZP CSI-RS included in the first PDSCH from among resources of the second PDSCH.

6. The wireless communication system of claim 5, wherein the heterogeneous processing operations comprise processing the PTRS or the aperiodic ZP CSI-RS in the first resource and the second resource in a first manner, and processing the first data and the second data in a second manner.

7. The wireless communication system of claim 1, wherein, the processor of the first cell is further configured to, based on a first scheduling mode being selected from among the plurality of scheduling modes, perform scheduling with the second cell in which a resource block on which rate matching of the first PDSCH is performed does not overlap with a resource block on which rate matching of the second PDSCH is performed.

8. The wireless communication system of claim 1, wherein, the processor of the first cell is further configured to, based on a second scheduling mode being selected from among the plurality of scheduling modes, perform scheduling with the second cell in which:
    data is not allocated to a first resource block overlapping a resource block on which rate matching of the second PDSCH is performed from among resource blocks of the first PDSCH, and
    data is not allocated to a second resource block overlapping resource blocks on which rate matching of the first PDSCH is performed from among resource blocks of the second PDSCH.

9. The wireless communication system of claim 1, wherein, the processor of the first cell is further configured to, based on a third scheduling mode being selected from among the plurality of scheduling modes, perform scheduling with the second cell in which:
    data is allocated to a first resource block overlapping a resource block on which rate matching of the second PDSCH is performed from among resource blocks of the first PDSCH, and
    data is allocated to a second resource block overlapping a resource block on which rate matching of the first PDSCH is performed from among resource blocks of the second PDSCH.

10. The wireless communication system of claim 1, wherein the processor of the first cell is further configured to control the first cell to transmit a downlink control information (DCI) indicating the selected scheduling mode to the terminal, or set the selected scheduling mode through upper signaling with the terminal.

11. A terminal comprising:
a radio frequency integrated circuit (RFIC) configured to receive a first physical downlink shared channel (PDSCH) from a first cell and a second PDSCH from a second cell based on a selected scheduling mode from among a plurality of scheduling modes related to rate matching of PDSCHs; and
a processor configured to perform processing on the first PDSCH and the second PDSCH based on the selected scheduling mode, and transmit performance information through the RFIC that indicates the terminal supports heterogeneous processing operations on resources allocated with a reference signal overlapping with resources allocated with data.

12. The terminal of claim 11, wherein the processor is further configured to perform the heterogeneous processing operations on resources allocated with a phase tracking reference signal (PTRS) or an aperiodic zero power channel status Information-reference signal (ZP CSI-RS) overlapping with resources allocated with data in the PDSCHs.

13. The terminal of claim 11, wherein the processor is further configured to perform a homogeneous processing operation on resources allocated with a PTRS or an aperiodic ZP CSI-RS overlapping with resources allocated with non-data in the PDSCHs.

14. The terminal of claim 13, wherein the homogeneous processing operation comprises a rate matching operation.

15. A method of operating a first cell of a wireless communication system which includes the first cell, a second cell, and a terminal, the method comprising:
selecting, by the first cell based on control information exchanged with the second cell and performance information received from the terminal that indicates whether the terminal supports heterogeneous processing operations on resources allocated with a reference signal overlapping with resources allocated with data, one of a plurality of scheduling modes related to rate matching of physical downlink shared channels (PDSCHs); and
transmitting, by the first cell, a first PDSCH to the terminal according to the selected scheduling mode while the second cell transmits a second PDSCH to the terminal according to the selected scheduling mode,
wherein the terminal processes the first PDSCH and the second PDSCH based on the selected scheduling mode.

16. The method of claim 15, wherein the selecting of the one of the plurality of scheduling modes comprises:
obtaining scheduling information from the second cell; and
selecting, by the first cell, the one of the plurality of scheduling modes based on the performance information and the scheduling information.

17. The method of claim 16, further comprising transmitting, by the first cell, a downlink control information (DCI) indicating the selected scheduling mode to the terminal, or setting the selected scheduling mode through upper signaling with the terminal.

* * * * *